March 22, 1955 W. ZECKENDORF ET AL 2,704,609
AUTOMOBILE VERTICAL CONVEYOR
Filed Aug. 24, 1949 14 Sheets-Sheet 1

INVENTORS.
WILLIAM ZECKENDORF
ALEXANDER H. McPHEE
BY
ATTORNEY.

March 22, 1955 W. ZECKENDORF ET AL 2,704,609
AUTOMOBILE VERTICAL CONVEYOR
Filed Aug. 24, 1949 14 Sheets-Sheet 5

INVENTORS.
WILLIAM ZECKENDORF
ALEXANDER H. McPHEE
BY
ATTORNEY.

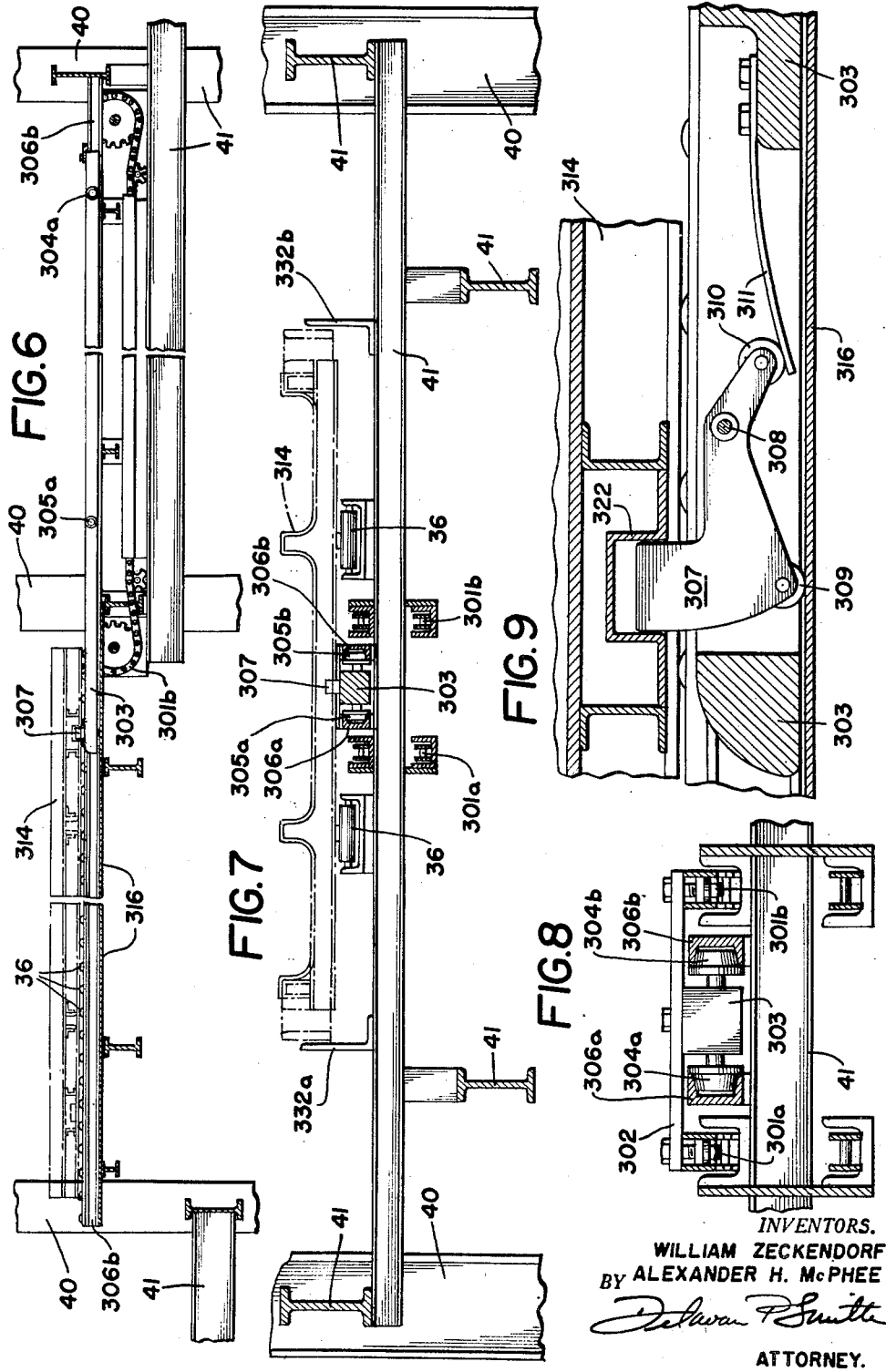

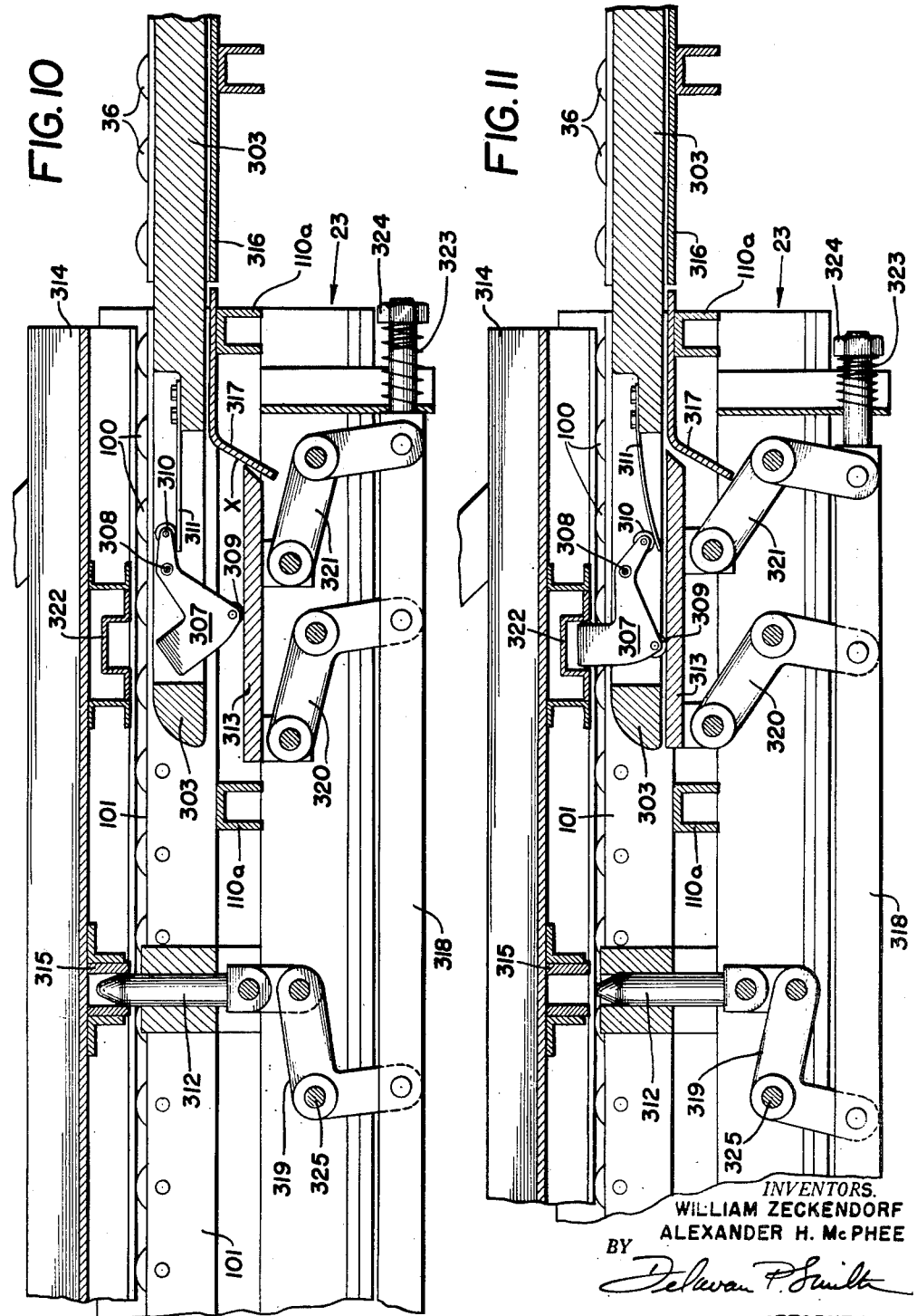

March 22, 1955  W. ZECKENDORF ET AL  2,704,609
AUTOMOBILE VERTICAL CONVEYOR
Filed Aug. 24, 1949  14 Sheets-Sheet 8
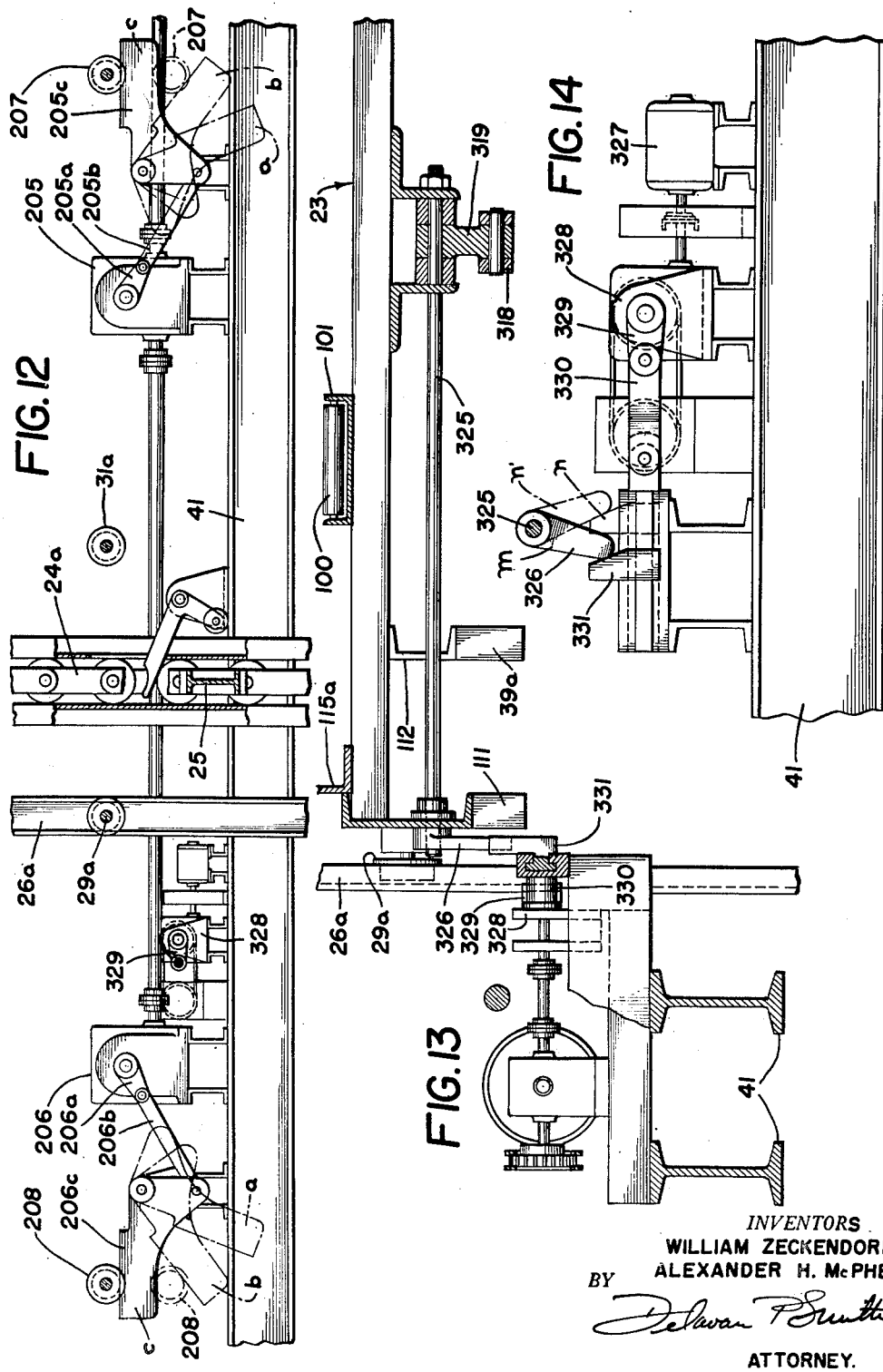
INVENTORS
WILLIAM ZECKENDORF
ALEXANDER H. McPHEE
BY
ATTORNEY.

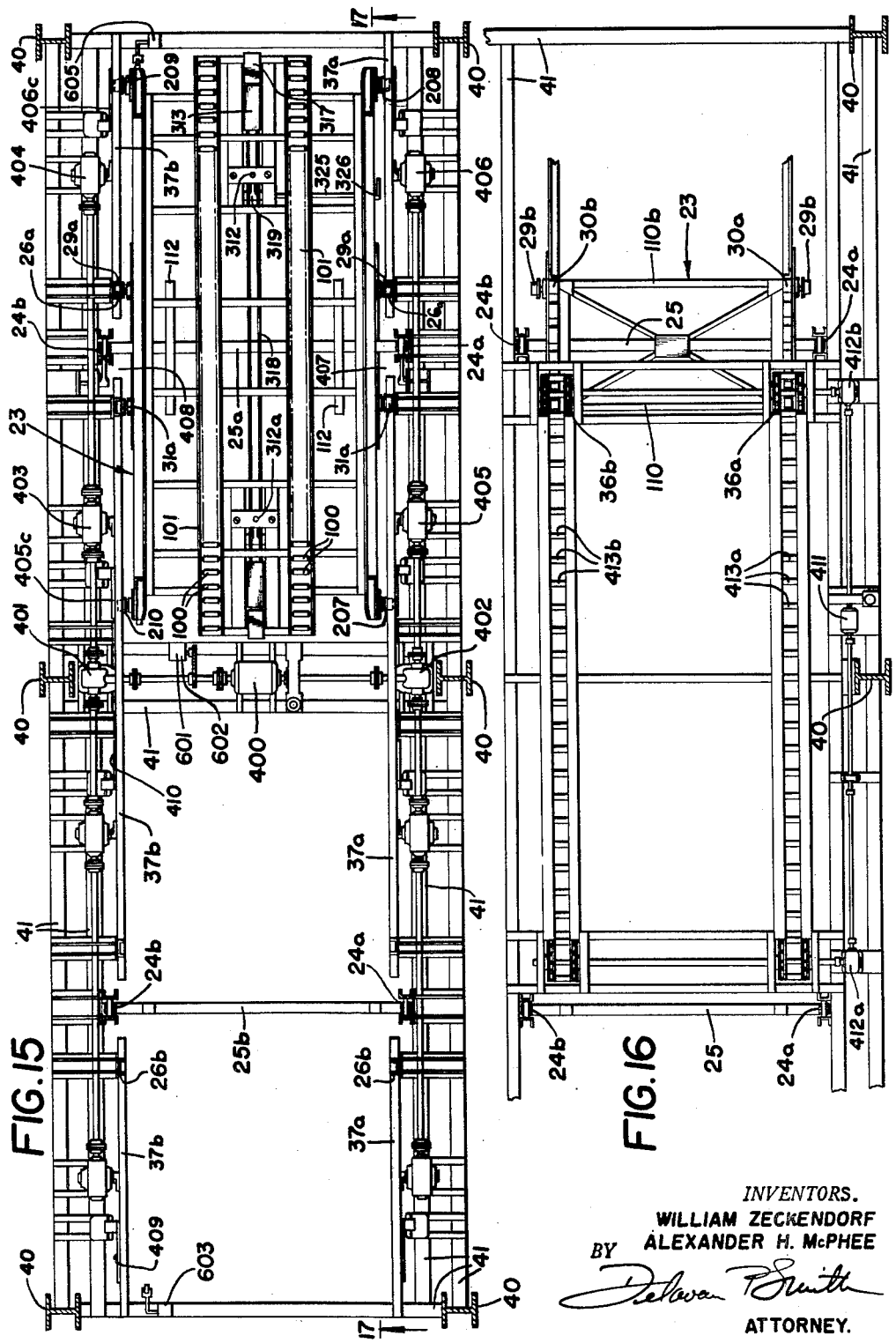

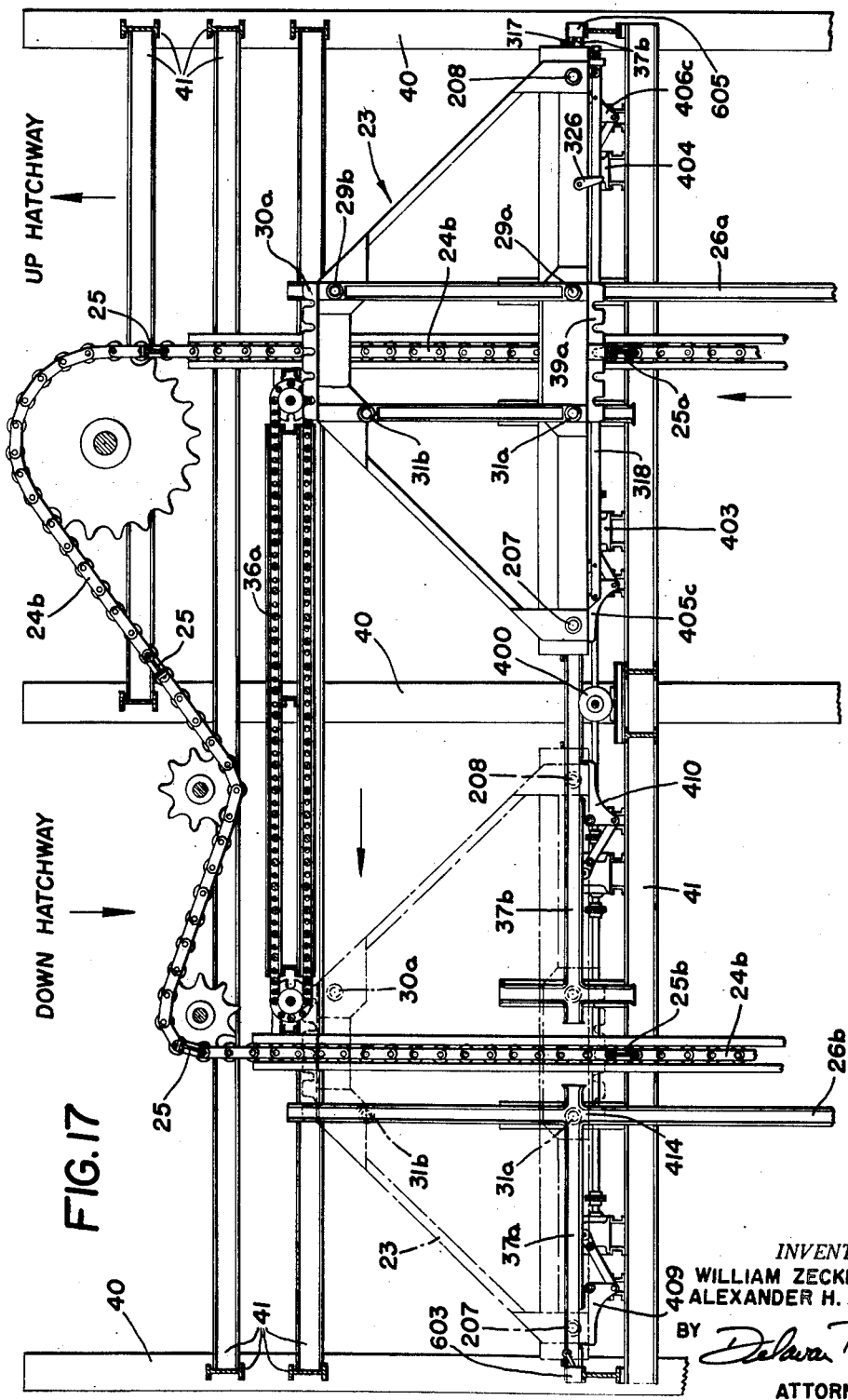

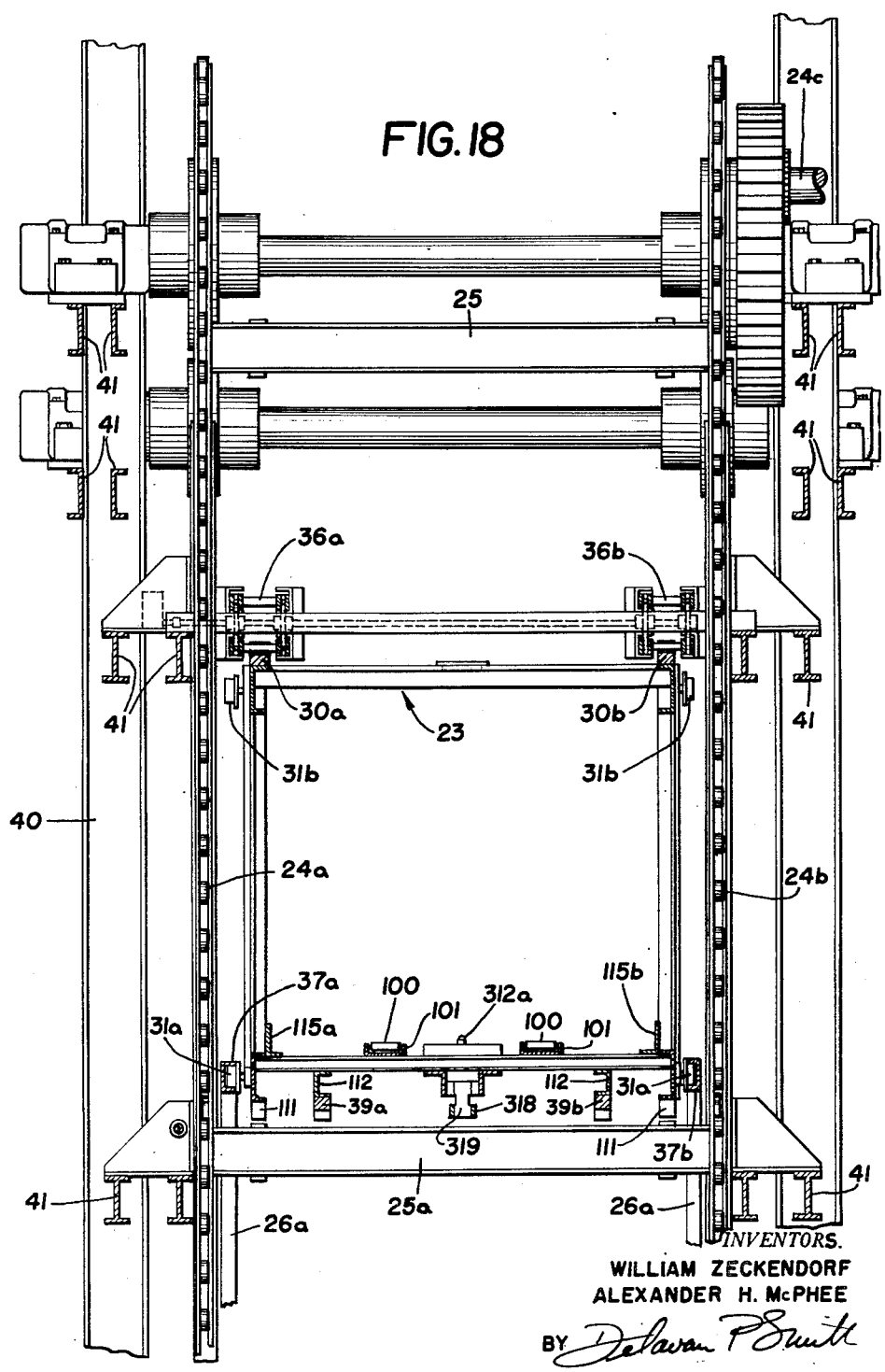

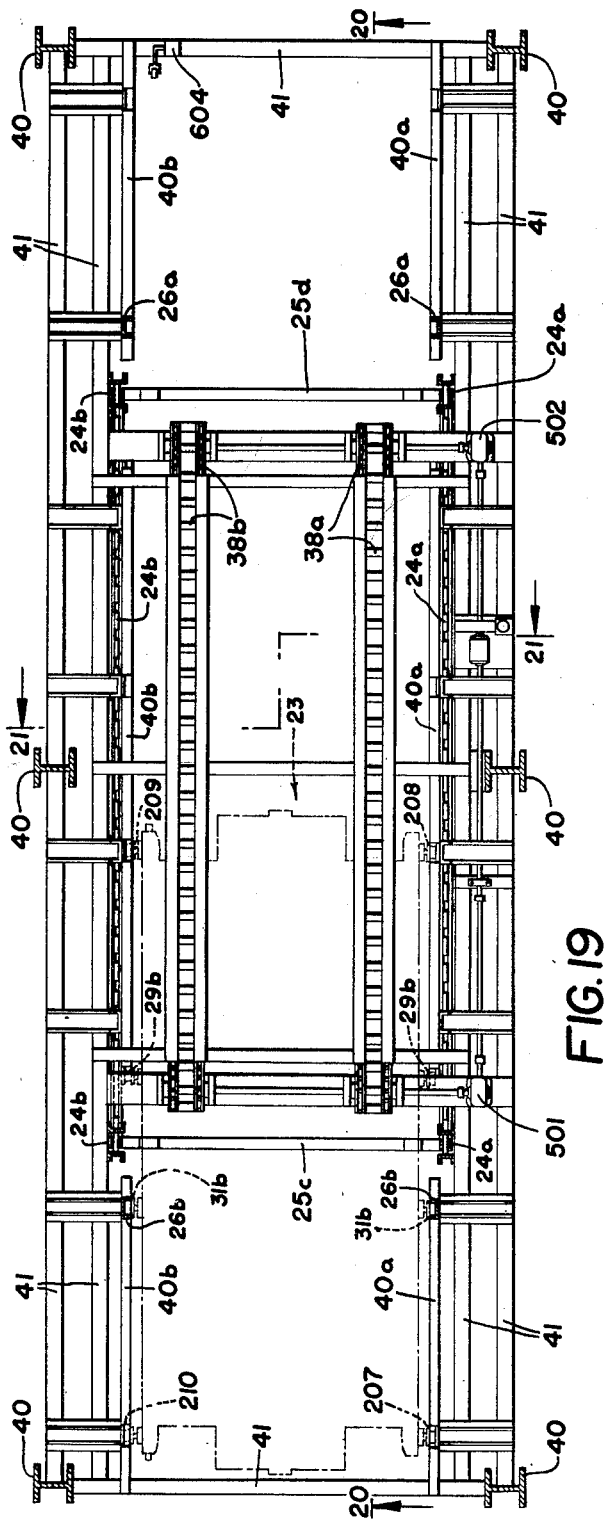

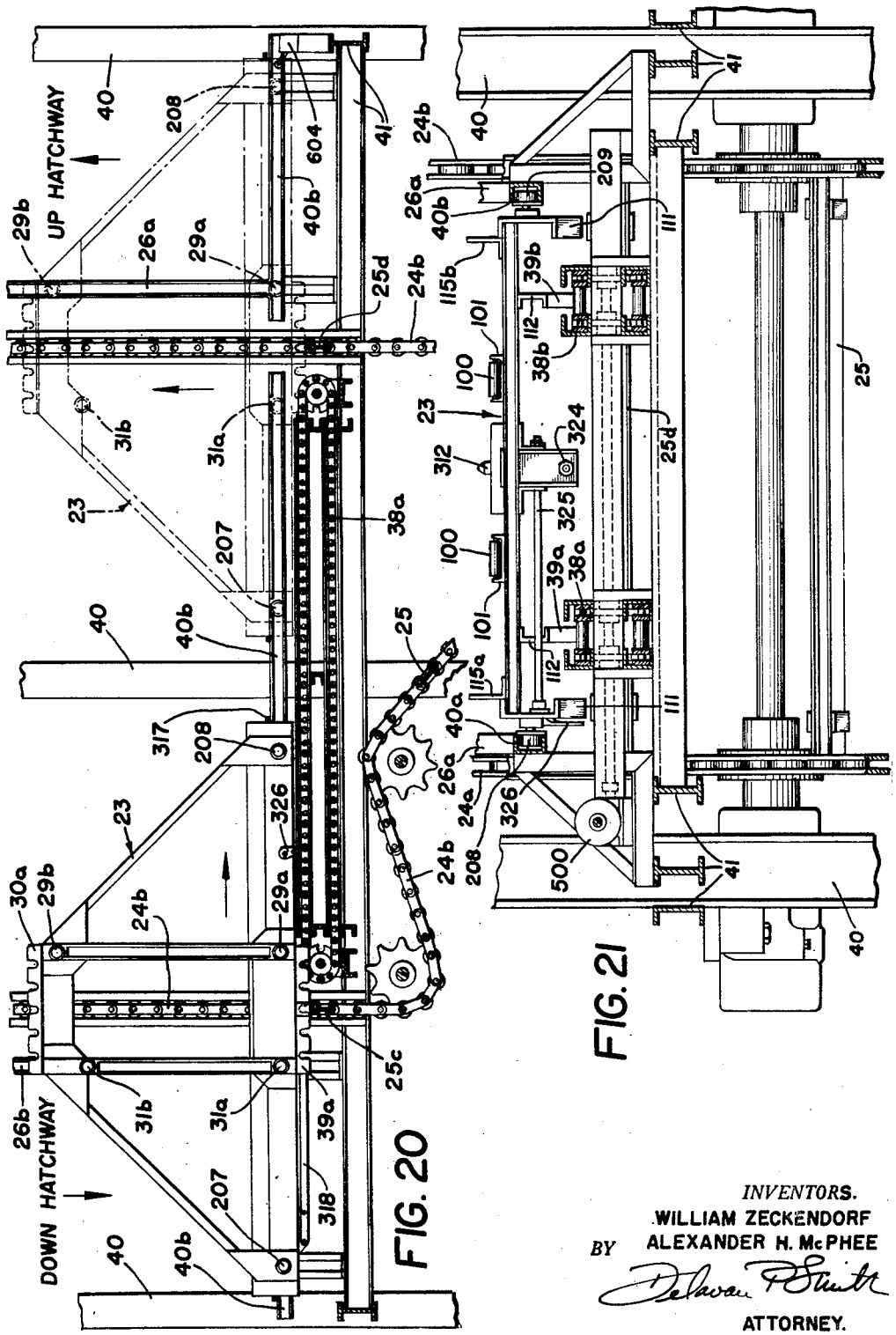

United States Patent Office 2,704,609
Patented Mar. 22, 1955

2,704,609

AUTOMOBILE VERTICAL CONVEYOR

William Zeckendorf, New York, and Alexander H. McPhee, Plandome Heights, N. Y., assignors to Webb & Knapp, Inc., New York, N. Y., a corporation of New York Application August 24, 1949, Serial No. 112,002

7 Claims. (Cl. 214—16.1)

The present invention relates to a conveyor system for vehicular parking. The system, in general, relates to the conveyance of such vehicles as automobiles to and from various vertical levels of a structure, and in particular, is adapted to cooperate with other systems for parking and unparking such vehicles.

In crowded centers of population, the problem of vehicular storage has become more pressing as time has increased the amount of traffic to which these centers are subjected. The matter of providing storage or parking for such vehicles has become increasingly difficult; the absence of parking lots and the elimination of street parking have contributed to aggravate the condition, especially in those locations where the traffic is of the highest density.

In garages as presently employed, considerable space is required for ramps, driveways, turn-outs, transfer aisles and other means of access to allow the parking and unparking of vehicles in various parts of the garage structure. In a co-pending U. S. application, Serial No. 102,550, filed July 1st, 1949 and now Patent No. 2,670,859 granted March 2, 1954, there is described a system for automatic parking and unparking of automobiles and vehicles, providing storage for a maximum number of automobiles through the use of overhead conveying mechanisms and mechanical arrangements designed to park and unpark automobiles without the use of ramps and transfer aisles, etc. Accordingly, this system of the co-pending application is suited to provide parking facilities for a large number of automobiles in congested districts with a minimum of ground or plan area.

In the aforesaid co-pending application, the parking system was described in detail with reference to a typical floor level. That is to say, one apparatus adapted to carry out parking and unparking operations was described with reference to one horizontal storage level, and for convenience, this was shown at the ground level.

According to the present invention, there is described a vertical conveyor system for automatically hoisting and lowering vehicles and automobiles to and from any one of a group of discrete parking levels, in cooperation with some system either as shown in the said co-pending application, or some other suitable parking system or arrangement.

In the said co-pending application, there is shown a system whereby automobiles to be parked are bodily transported over the parking level or floor at a distance sufficiently above the floor level to clear automobiles that previously have been parked on that level. Thus, it is possible to set an automobile down onto the floor or parking level from above the tops of other parked cars in any unoccupied parking stall even though it be in a stall remote from the entrance to that floor. Thus, the entire floor area may be used for parking automobiles so as not to waste floor area which otherwise might be necessary for transporting cars on a given floor level. By reverse movement, any automobile among the cars parked on a given level may be unparked and delivered to an appropriate exit without disturbing other parked automobiles.

In one form of apparatus and mechanism described in the aforesaid co-pending application, there is provided a dolly for each automobile to be parked. The automobile is driven onto a dolly which is provided with means to keep the automobile secured to it. When the automobile is made fast to the dolly, both dolly and the automobile on it are lifted together bodily by means of a hoist mechanism to a height which is higher than the tops of parked automobiles. The hoist mechanism is mounted on a carriage, called a "transfer car," above the hoist car, and the transfer car is in turn supported and movable on another higher set of tracks running in a direction at right angles to the hoist car tracks. Also supported above the parking level is a plurality of parallel sets of tracks running at right angles to the transfer car tracks and arranged so that each pair can be registered with the section of hoist car tracks mounted on the transfer car so that the hoist car can be moved laterally away from the transfer car.

Thus, by an arrangement of the overhead tracks, transfer car and hoist car, an automobile fastened to a dolly may be picked up from an original position on the given floor level, called the "receiving station platform," transferred over the tops of any previously parked automobiles, and set down in an unoccupied parking stall. Conversely, a parked automobile in any stall may be picked up and delivered to a "delivery station platform" on the same floor level. As previously mentioned, the entire floor area, except for receiving and delivery station platforms, may be divided off into parking stalls and used as such without floor area being taken up by transfer aisles on the floor area, which otherwise is wasted as parking space. Thus, automobiles may be parked adjacent one another over the entire floor area.

To provide the maximum efficiency from such a parking system, a plurality of parking levels may be placed one above the other; as a result, the ground occupied by the parking system will be utilized with an efficiency dependent largely upon the number of levels which may be satisfactorily employed.

A car coming from the street to be parked is placed at the ground floor "receiving station platform." The hoist car and transfer car means described in the co-pending application may be utilized for transferring such an automobile to various positions on the ground floor level.

According to the present invention, when it becomes desirable to park an automobile on a level other than the ground floor level, the incoming automobile, after being secured to a dolly as before, is loaded upon a "vertical conveyor carriage" instead of being lifted by the hoist car. This carriage is adjacent to the ground floor receiving station platform and connects with a pair of endless conveyor chains, to which an upward motion may be imparted. After being loaded, the dolly and automobile are hoisted by an upward movement of the conveyor chains and carriage to the desired floor level, where they are withdrawn from the carriage to the "receiving station platform" on the floor selected. The remainder of the parking operation may be as described with reference to the said co-pending application.

When the automobile is to be unparked, it is delivered to the "delivery station platform" of the floor on which it was parked. This "delivery station platform" is adjacent to a carriage connected with the downward travel of the aforementioned endless conveyor chain. The automobile and dolly are loaded upon the latter carriage and returned to ground level. Upon reaching the ground level, automobile and dolly are removed from the carriage to the ground floor "delivery station platform." The automobile may then be driven off the dolly and delivered to the street. It is a feature of the invention to perform the sequences of parking and unparking automatically.

The endless conveyor chains previously alluded to may be two "link-belt" type chains, the chains being located on each side of the hatchways. The two chains travel simultaneously up an "up" hatchway, over a set of sprockets to reverse direction, and down the "down" hatchway to a second set of sprockets, where the chain direction of the chain is again reversed, and so on. The conveyor chains are laterally interconnected by an "I" section chain beam upon which the conveyor carriages may rest. One or more of the sprockets may be driven by a motor to impart the desired chain travel.

The same carriages are utilized for both hoisting and lowering in conjunction with the conveyor chains. Means are provided to transfer the carriages between hatchways at the upper and lower limits of their travel. At the upper limit of travel, the carriage is transferred from the chain travelling in the "up" hatchway to the chain travelling in the "down" hatchway and, conversely at the lower limit of travel, from the "down" to the "up" hatchway.

The object of the invention is to provide an automatically operated vertical conveyor system for delivery and return of automobiles and vehicles to and from one of a group of predetermined parking levels.

Other objects and advantages of this invention, residing in the novel features of construction, arrangement and combination of parts, will become more apparent from the description of the specific embodiments hereinafter following. It will be understood that certain features of the invention may be utilized other than in the entire arrangement disclosed.

Although such novel features as are believed to be characteristic in the invention are pointed out in the claims, the invention itself, as to its objects and advantages and the manner in which they may be carried out, may be better understood by reference to the description following and the accompanying drawings:

Figure 6 is a view on line 6—6 of Fig. 3.

Figure 7 is a view on line 7—7 of Fig. 3.

Figure 8 is a view on line 8—8 of Fig. 3.

Figure 9 is a view on line 9—9 of Fig. 3.

Figure 10 is an enlarged view of a portion of Fig. 5.

Figure 11 shows the same view as Fig. 10 representing a further position of operation.

Figure 12 is a view on line 12—12 of Fig. 2.

Figure 13 is a view on line 13—13 of Fig. 2.

Figure 14 is a view on line 14—14 of Fig. 2.

Figure 15 is a plan view at the upper carriage transfer of the vertical conveyor on line 15—15 of Fig. 1.

Figure 16 is a plan view of the upper carriage transfer drive on line 16—16 of Fig. 1.

Figure 17 is a side elevation of the upper vertical conveyor carriage transfer and sprocket system on line 17—17 of Fig. 15.

Figure 18 shows a front elevation of the upper vertical conveyor carriage transfer and sprocket assembly on line 18—18 of Fig. 1.

Figure 19 is a plan view of the lower vertical conveyor carriage transfer on line 19—19 of Fig. 1.

Figure 20 is a section of the lower vertical conveyor transfer drive on line 20—20 of Fig. 19.

Figure 21 is a section through the lower transfer drive on line 21—21 of Fig. 19.

General operation

Figure 1:
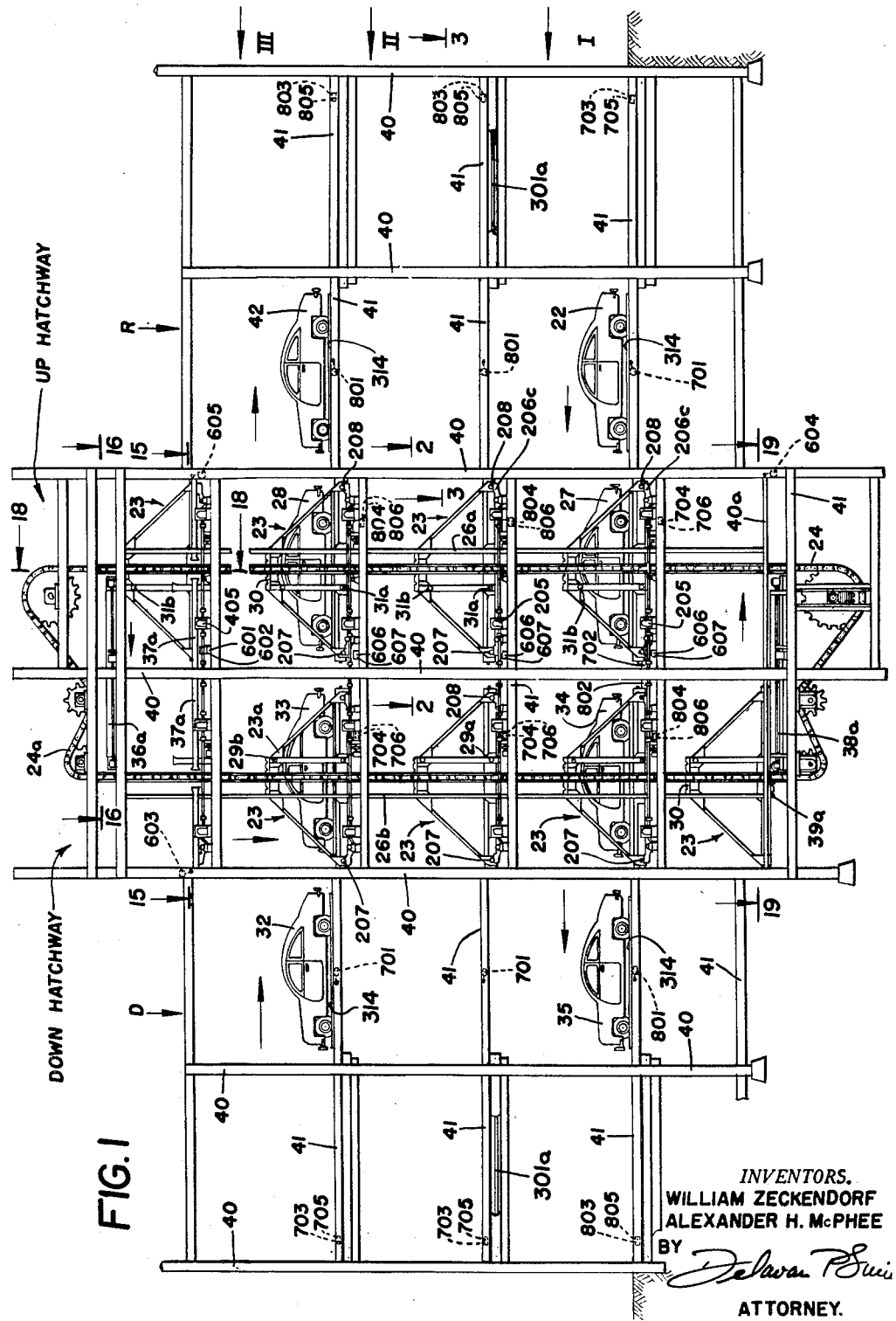
Figure 1 shows a side elevation of a vertical conveyor according to the invention.

Referring now to the drawings, in which like reference numerals indicate like parts:

Fig. 1 shows a section elevation through a parking structure at the vertical conveyor, according to the invention. Although a given parking structure may employ one or more vertical conveyors, for simplicity, a system employing a single vertical conveyor will be described.

In Fig. 1, three parking levels, I, II, III are shown, each of the three levels shown being part of a large parking area. While reference is made to three parking levels, it is to be understood that a greater or lesser number of parking levels may be employed without departing from the spirit and scope of the invention. Positions on each of the floor levels located vertically with respect to the section marked "R" are the "receiving station platforms," and positions on each of the floor levels located vertically with respect to the section marked "D" are "delivery station platforms." For one vertical conveyor, one receiving and one delivery station platform is associated with each of the floor levels.

Assuming that floor level I is the ground or street floor level, an automobile may be driven through an entrance or opening of the structure, to the receiving station platform on floor I, at which time the automobile may occupy a position as shown at 22 in Fig. 1. Driving the automobile to position 22 places it on a "dolly." For a complete description of a mode of construction for such a dolly, reference is made to the aforesaid co-pending U. S. application, Serial No. 102,550. In brief, a dolly is a metal tray or receptacle adapted to receive an automobile thereon. As further described in the co-pending application, after being driven onto the dolly, the incoming automobile is secured thereto; all movements of the automobile are thenceforth obtained by movement of the dolly, and further operation of the automobile is rendered unnecessary. In accordance with the description in the aforesaid co-pending application, the car, as placed on the said dolly, may be transferred by an arrangement of overhead tracks, transfer cars and a hoist car, to any position on the ground floor.

According to the present invention, in the event that it is desired to transfer an automobile, as shown at 22 in Fig. 1, to another floor level such as II or III, a mechanism is provided which moves the dolly and automobile to a conveyor carriage 23 as shown in Figs. 1, 2, 4 and 5. Both the receiving station platforms and the floor of the carriage are equipped with rollers to allow a free transverse movement of the dolly thereon. In Fig. 1, the carriage 23 is shown as part of a vertical conveying system which operates in two hatchways between the ground level and the upper floor levels. The movement of the vertical conveyor is always in the same direction; upward on the side adjacent the receiving station platforms and downward on the side adjacent the delivery station platforms. The movement of the conveyor is intermittent to permit loading, unloading and carriage transfer operations at the various parking levels.

The vertical conveyor consists of two series of endless conveyor chains, 24–a and 24–b, and may be seen in Figs. 2, 4, 5, 12, 17, 18, 20 and 21. As shown in Fig. 1, these conveyor chains are provided with a counter-clockwise motion, traveling up the "up" hatchway, around an upper group of sprockets, down the "down" hatchway and around the lower group of sprockets. One of these sprockets is driven to impart an upward travel to the chain when in the "up" hatchway adjacent the receiving station platforms, and a downward travel in the "down" hatchway adjacent to the delivery station platforms. The two endless conveyor chains are located on each side of the hatchway and are spaced a lateral distance between each other sufficient to accommodate a trapezoidally shaped carriage, such as 23, between the chains. A series of chain girders, such as 25 in Figs. 2, 4, 5, 12, 15, 17 and 20, are laterally fixed between the two endless chains 24–a and 24–b, and are interspaced along the chains a distance equal to the height of one floor level.

The chain girders 25 support and move the various conveyor carriages, such as 23; pads on the bottom of the carriages rest upon the chain girders. During their travel in the "up" and "down" hatchways, the carriages are maintained in alignment and restrained from other than vertical motion by vertical alignment channels 26–a on either side of the "up" hatchway, and 26–b on either side of the "down" hatchway. These vertical alignment channels are shown in Figs. 1, 2, 4, 12, 13, 17 and 18. The carriages are each provided with a pair of idler pulleys such as 29–a and 29–b and 31–a and 31–b on each side. Idlers 29–a and 29–b engage the channels 26–a during the movement of the carriage in the "up" hatchway, and idlers 31–a and 31–b engage channel 26–b in the movement of the carriage in the "down" hatchway. These idlers are fixed in the plane of the conveyor carriages and will permit them only a vertical motion during their travel in the hatchways.

The performance of the conveyor chain is such as to stop at a vertical position, aligning each of the carriages somewhat below the adjacent floor level. Complete alignment between the carriages and the floors is obtained by a motor-driven leveling system, later to be described. Assume that the incoming automobile delivered to the ground floor receiving station platform at position 22 has been mechanically loaded on the carriage to position 27. The loading is accomplished by moving the dolly, upon which the automobile has been placed, with electrically controlled machinery later to be described. The conveyor chains 24–a and 24–b will be activated and will subsequently hoist the carriage, floor by floor, bringing the automobile and dolly to the desired floor level, e. g., floor level III. At this time, the automobile will be in position shown at 28. The dolly and automobile are then withdrawn from position 28 and the carriage to floor III receiving station platform, position 42. The unloading arrangement, by which this is accomplished, is later described in detail. The removal of the dolly is achieved by sliding the latter over rollers located both at the carriage and the receiving station platform. From position 42, the receiving station platform of floor III, the dolly and automobile may be transferred to any desired location on floor III by any suitable parking means such as the overhead tracks and transfer and hoist car system indicated in the aforesaid U. S. application Serial No. 102,550.

To unpark an automobile from a given upper floor level, the dolly and automobile must be transported to the delivery station platform of the floor level on which the automobile is located. The said co-pending application, Serial No. 102,550, describes means whereby such a transportation may be effected. If, as in the previous example, the automobile is assumed to be located on floor III, it must reach the delivery station platform at position 32 in Fig. 1. Loading means, later described, are then provided to engage the dolly and automobile, rolling it upon a waiting carriage, 23–a in Fig. 1, to position 33.

When the loading of the automobile and dolly upon the vertical conveyor carriage 23–a is complete, the conveyor chains resume their travel and the carriage 23–a will be lowered, floor by floor, until the ground floor is reached. Upon reaching the ground floor, the carriage is leveled and unloading means are provided to withdraw the automobile, now in position 34, from the vertical conveyor carriage to the ground floor (I) delivery station platform, in position 35. The automobile may thence be driven from position 35 and the parking structure, to the street.

Both the parking and unparking operations above outlined are caused to occur automatically. Once the automobile is at the ground floor receiving station platform for parking, or the delivery station platform of one of the upper floor levels for unparking, the succeeding operations will be performed automatically upon it.

At the ends of travel of the "up" and "down" hatchways, the conveyor carriages, such as 23, are disengaged from the conveyor chains and chain beams and are transferred from one hatchway to the other.

The carriage transfer is accomplished at the end of travel in the "up" hatchway by the inclusion of an upper transfer level, located one story above the highest parking level. The upper transfer arrangement will be later discussed in detail. In general, when a carriage comes to rest at the upper transfer level, the carriage is lifted from its chain beams, 25–a in Fig. 17. Engagement is then made between a pair of endless link-belt chains 36–a, 36–b in Figs. 1, 16, 17, 18, called the upper transfer chains, and the gear racks 30–a, 30–b in Figs. 1, 4, 5, 16, 17, 18, atop the carriage 23. A pair of horizontal alignment channels, 37–a and 37–b in Figs. 1, 15, 17 and 18, engage a series of idlers on the cariage in horizontal alignment with the conveyor carriage idlers 29–a and 31–a. These idlers provide a horizontal path for the carriage, allowing a horizontal movement of the latter from the "up" hatchway to the "down" hatchway. The carriage is then lowered to a waiting chain beam, 25–b in Fig. 17, and the conveyor operation may then continue.

Similarly, a lower transfer level is provided one floor height below the lowest level to which cars are to be parked, to transfer the vertical conveyor carriages, as 23, from the "down" hatchway to the "up" hatchway. A second set of endless link-belt chains, 38–a and 38–b, in Figs. 1, 19, 20 and 21, called the lower transfer chains, engage a lower set of gear racks 39 in Figs. 4 and 20 on the carriage, when the carriage has reached the lower transfer position. Horizontal alignment channels 40–a and 40–b in Figs. 1, 19, 20 and 21 engage the series of idlers on the carriage in horizontal alignment with the carriage idlers 29–a and 31–a. These idlers provide a horizontal path for the carriage to move from the "down" to the "up" hatchway. An appropriately located chain beam, 25–d in Fig. 20, will lift the underside of the carriage from the horizontal alignment channels 40–a and 40–b. The carriage may then continue its travel in the "up" hatchway, to perform the functions previously outlined.

Figure 2:
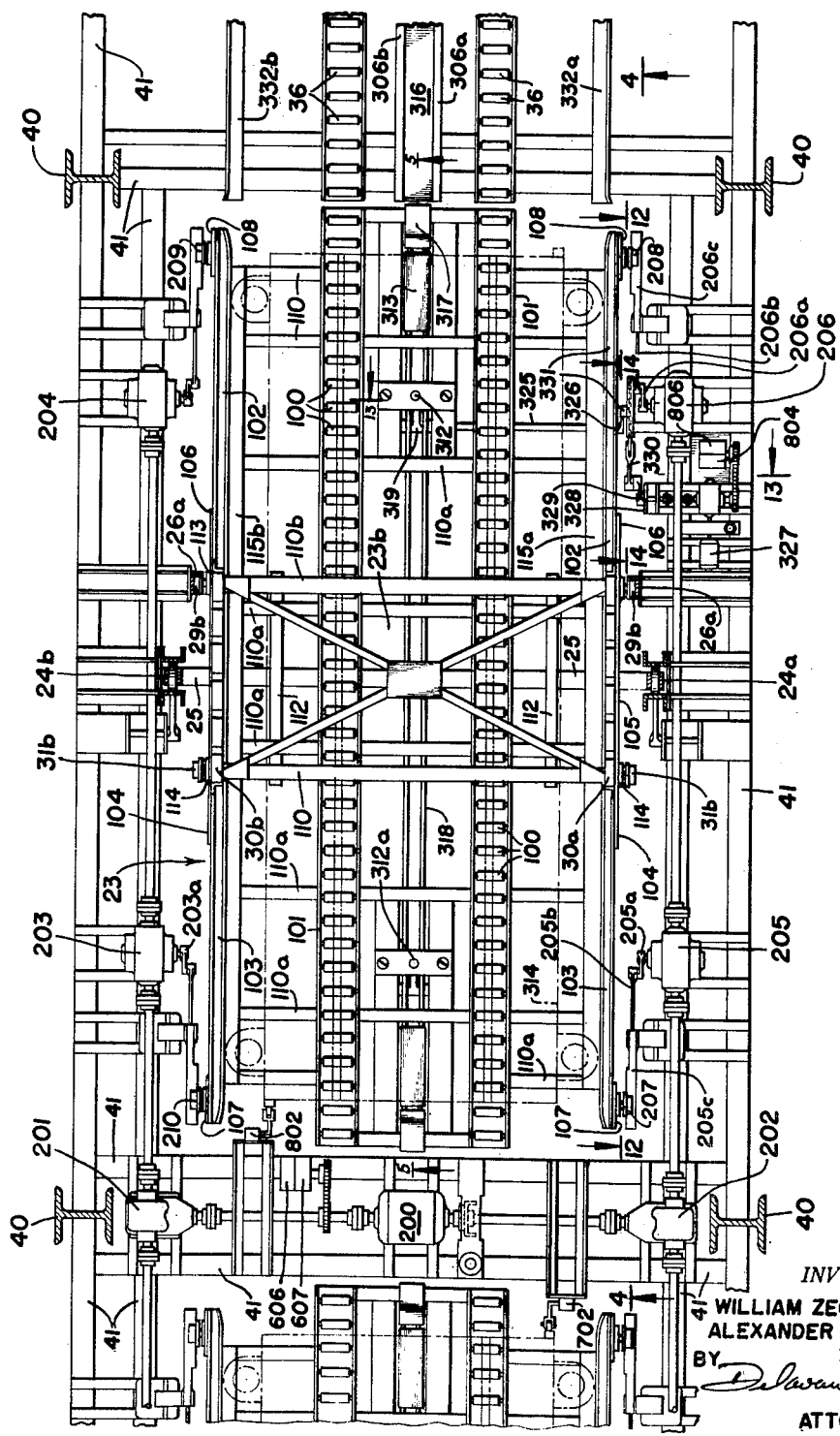
Figure 2 is a plan view of a vertical conveyor carriage and is a view on line 2—2 of Fig. 1.

The general construction of the parking structure, while susceptible of many modes of construction, may comprise an "I" section steel framework as described in the previously mentioned co-pending U. S. application, Serial No. 102,550. Thus, a vertical framework 40, comprised of a series of vertical "I" sections as shown in Figs. 1 and 2, transfer the individual transverse loads to the foundation structure. An intermediate horizontal framework 41, transfers the actual floor loads to the vertical framework 40, providing the necessary support for the various parts of the parking mechanism and for the parked automobiles. It is obvious that connections between the various load bearing members of the parking structure may be made by welded, riveted or other means of connection as may be most expedient.

Carriages

The carriages have been described as performing the duty of receiving the dolly and automobile for hoisting or lowering to various floor levels in the parking structure. These carriages, such as 23, rest upon chain beams 25 and are maintained in vertical alignment, while traveling in the hatchways, by the alignment channels. These alignment channels are 26–a in the "up" hatchway, and 26–b in the "down" hatchway. The alignment channel 26–a engages idlers 29–a and 29–b in the "up" hatchway, while channel 26–b engages idlers 31–a and 31–b in the "down" hatchway. These idlers are located in a fixed plane on the sides of the carriages.

Figure 4:
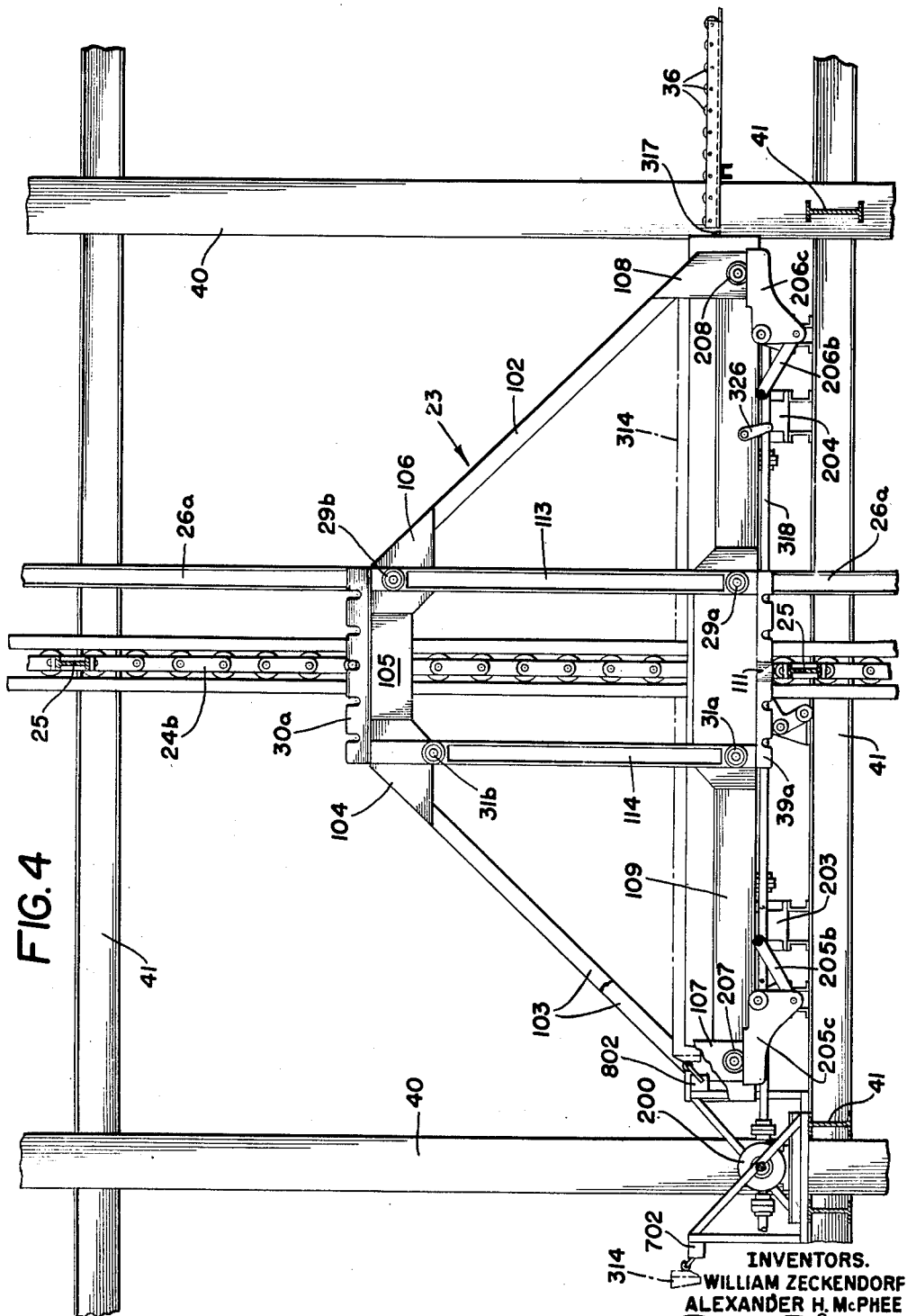
Figure 4 shows a side elevation of a vertical conveyor carriage and is a view on line 4—4 of Fig. 2.
Figure 5:
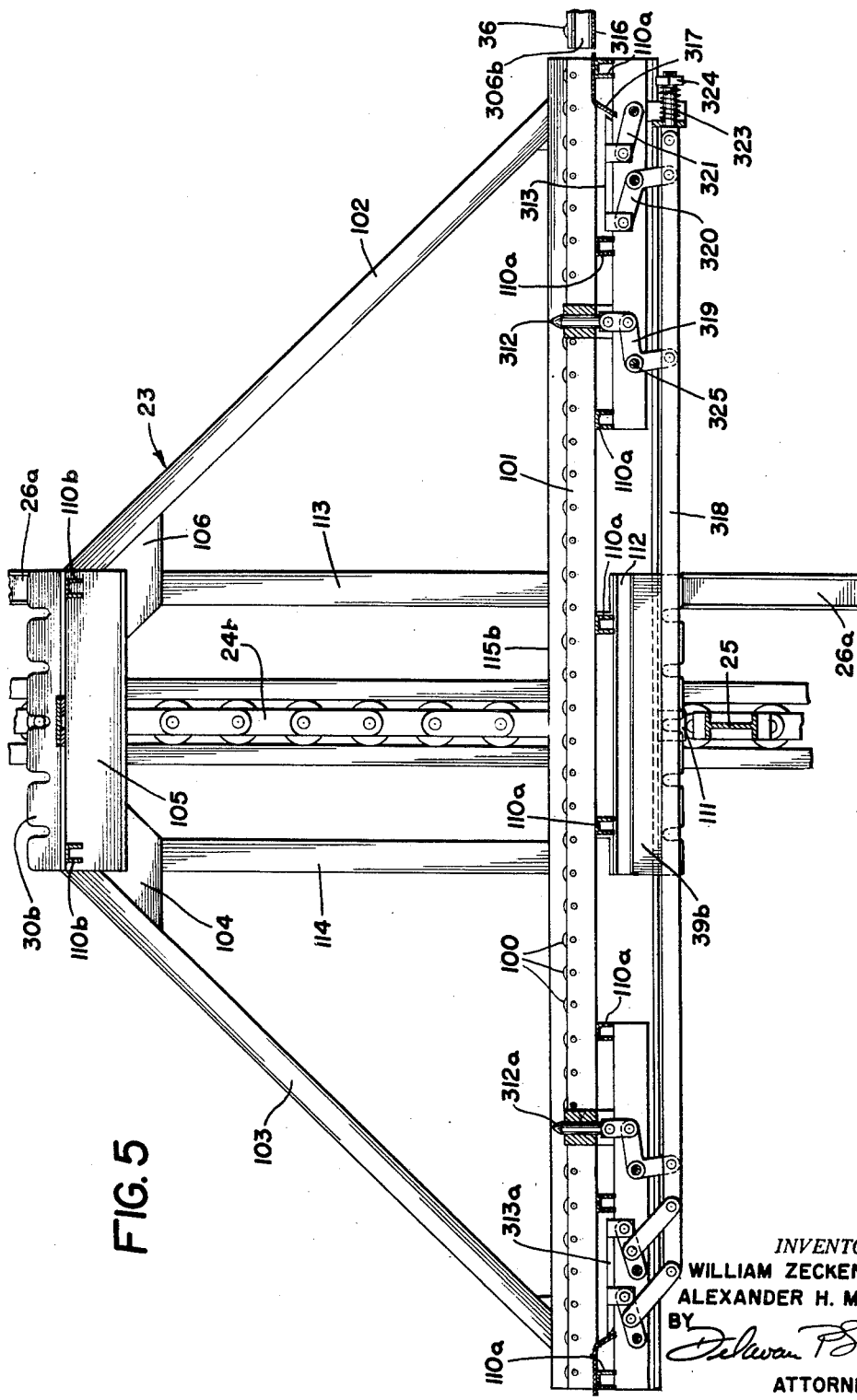
Figure 5 is a cross-section side elevation of the vertical conveyor carriage and is a view on line 5—5 of Fig. 2.

Details of carriage construction may be seen with reference to Figs. 2, 4 and 5. Thus, in Fig. 2, a plan view of a carriage 23–b is shown at rest in the "up" hatchway and in alignment with floor level II. It will be seen that the carriage must have a width between its vertical side structures sufficient to accommodate an automobile and dolly. A group of rollers, 100, are fitted in roller supports 101 on the base of the carriage. The purpose of the rollers, 100, is to lessen the friction between the carriage and dolly as the latter is loaded and unloaded from the carriage to and from the cooperating guides and rollers 36 of the adjacent receiving station platform. A pair of L section guide rails 115–a and 115–b guide the position of the dolly on the carriage as it rests or moves on the rollers 100. The carriage is constructed to permit loading and unloading of the dolly from either end; a feature necessary to permit the use of the carriages in both the "up" and "down" hatchways. The means by which the dolly and automobile are transferred from the various carriages to the adjacent station platforms will be later discussed.

Each of the aforementioned vertical side sections of the carriage are comprised of members 102, 203, 104, 105, 106, 107, 108, and 109 fabricated to form a trapezoidal framework as shown in Figs. 4 and 5. The two vertical, trapezoidally shaped carriage sides are interconnected at the bottom of the carriages by a series of transverse channels 110–a and at the top of the carriages by channels 110–b. The channels 110–a carry the roller supports 101, which in turn carry the weight of the dolly and automobile resting on the rollers. The transverse channels 110–a and 110–b, together with the trapezoidally shaped side sections, provide a solid structure forming the carriage and providing the requisite strength.

Lifting pads, 111 (Figs. 4, 5 and 18) are attached to the bottom of the carriages, making contact with the chain beams 25. These pads provide a lifting surface through which the conveyor chain motion is imparted to the carriage. In Figs. 4, 5 and 18, the pads 111 are not in contact with the chain beam 25. This is because the carriage is represented in that portion of its cycle of operation wherein it is aligned with the floor level of the cooperating parking level. Independent means, later to be described, show how the carriage is lifted from the chain beam to provide a perfect alignment with the adjacent floor level. In normal travel in the hatchways, however, the carriage pads, 111, will rest on the chain beam. Pads are provided under cross-beams 112 (Fig. 2), accepting a portion of the load from the adjoining channels 110–a as shown in Fig. 2.

The idlers 29–a, 29–b and 31–a, 31–b are connected to vertical members 113 and 114 respectively. Vertical framing members 113 and 114 form a part of the trapezoidal side sections of the carriage, and define a vertical plane at the side of the carriages. Any tendency for the carriage to tip as a result of a couple exerted about the pads 111 and chain beam 25, is absorbed by these idlers resting in the vertical alignment channels 26–a and 26–b.

For example, in Fig. 4, showing the carriage as it rests in the "up" hatchway, the idlers 29–a and 29–b will be engaged in the alignment channels 26–a, restraining the carriage from any motion save the "up" motion imparted by movement of the conveyor chains and the attached chain beam 25.

*Carriage leveling*

It has been stated that the vertical conveyor chains will transport the carriages to a position slightly below the level of the adjacent station platform. This condition is made to exist in both "up" and "down" hatchways. The apparatus for bringing the carriages in level alignment with respect to their various cooperating station platforms may be seen with respect to Figs. 2, 4 and 12.

In Fig. 2, for example, a typical arrangement for leveling the carriages is shown attached to various members of the parking structure framework.

For convenience, in this figure, the leveling apparatus has been shown with regard to a typical "up" hatchway. Identical arrangements are provided in the "down" hatchway to accomplish leveling in the manner described, and in the arrangement shown. The "up" and "down" hatchways of corresponding floor levels are energized by the same "floor leveler" motor.

An electric motor 200, called the "floor leveler" motor, provides the primary source of mechanical power for the operation of the leveling apparatus. The motor 200 is provided with a duplex drive shaft and will provide torque to two right angle gear drives, 201 and 202, through intermediate shafting. One output of the gear drive 201 is coupled by shafting to two gear boxes connected in tandem 203 and 204. Similarly, two gear boxes 205 and 206 are connected together in tandem to one mechanical output of gear drive 202. Gear boxes 203, 204, 205 and 206 are power take-off gear boxes arranged to provide a short output stroke of large mechanical advantage at a crank arm, such as 203–a.

Referring to Figs. 2 and 4, it may be seen that four idlers 207, 208, 209 and 210 are provided near the corners of the carriage 23. Each of these idlers is firmly fixed in a vertical side plane of the carriage by virtue of structural members corresponding to 107 and 108. It will be found that idlers 207, 208, 209 and 210 fall in the same vertical plane as the previous mentioned idlers 29–a, 29–b, 31–a and 31–b.

Referring now to Fig. 12, some of the leveling apparatus is to be seen in greater detail. When leveling of the carriage is to be achieved, tandem gear boxes 205 and 206 operate to drive the crank arm 206–a in a clockwise motion; the crank arm 205–a in a counter-clockwise motion. Drag links 205–b and 206–b connect the motion of crank arms 205–a and 206–a respectively to "cam" cranks 205–c and 206–c.

While the carriages are proceeding up and down the hatchways, the gear boxes and their associated cranks and drag links, are shown with "cam" cranks 205–c and 206–c withdrawn to dotted position "a." Thus, although cranks 207 and 208 are in the vertical plane of the cam cranks 205–c and 206–c respectively, they will not be engaged nor will they interfere with cam cranks 205–c and 206–c; the latter, withdrawn to position "a," will be out of vertical alignment with idlers 207 and 208.

When the carriages stop in the hatchway at the resting position of the conveyor chains, it has been stated that the carriages will be slightly below the level of the respective station platform. At such time, the idlers 207 and 208 will assume some position comparable to the lower position shown dotted in Fig. 12. As the levelling apparatus is brought into play, motor 200 is energized, driving the gear boxes 205 and 206, and the cam cranks 205–c and 206–c to positions at "b" where engagement will be made between the cam faces of the cam cranks and the idlers 207 and 208. As the levelling apparatus continues in operation, the cam cranks 205–c and 206–c will ultimately reach the position shown at "c," lifting the carriage, by idlers 207, 208, 209 and 210, from the support of the chain beam 25 and the conveyor chains 24. As the levelling apparatus and its associated cam cranks are fixed with relation to the framework of the parking structure, variations in the resting position of the conveyor chains will not affect the accuracy of the levelling apparatus. The levelling arrangement lifts the carriage from the chain beam and brings it into horizontal alignment with the adjacent station platform at the time the cam cranks reach position "c" in Fig. 12. As two cam cranks are provided for each side of the carriage, a four point suspension of the carriage on the parking structure framework is achieved.

Minor variations in the relative position of the carriage and floor level, when the conveyor chains come to rest, will not interfere with the leveling apparatus. The cam cranks, as 205–c and 206–c, will pick up the cooperating carriage idlers 207 and 208 over a vertical range of idler positions; it is for this reason that the load face of the cams, such as 205–c and 206–c, is made long enough to engage the idlers 207 and 208 over a range of vertical positions. Thus, the resting position of the conveyor chain system must only be sufficiently accurate to stop at some point which will allow the cams 205–c and 206–c to engage the carriage idlers 207 and 208. When this condition is met, the leveling apparatus will lift the carriages from the chain beams as 25, to proper alignment with the various station platforms. Each of the receiving and delivery station platforms has an associated leveling apparatus located in the adjacent hatchway.

When the carriage loading or unloading operations have been completed, floor leveling motor 200 in Fig. 2 is reversed in its direction of rotation, reversing the operation of the gear boxes 205 and 206. The motion of these gear boxes will be transmitted through the cranks 205–a and 206–a and drag links 205–b and 206–b to the cam cranks 205–c and 206–c. The latter will be withdrawn from positions corresponding to "c," through position "b," to "a." This withdrawal will redeposit the carriages upon the chain beam 25 and remove the cam cranks from mechanical interference with the idlers of succeeding carriages; the vertical conveyor chains may then once more proceed to lift or lower the carriages, free from the action of the leveling apparatus.

*Loading and unloading*

Automatic means are provided to load and unload the dollies and automobiles from the carriages to and from the various station platforms. The operation of the loading and unloading arrangements can be seen with reference to Figs. 2, 3, 4, 5, 6, 7, 8, 9, 10, 11, 13 and 14.

It is the purpose of the loading and unloading apparatus to withdraw a dolly and automobile from the carriage to the adjacent station platform, and to load the dolly and automobile upon the carriage from the adjacent station platform. Ordinarily, only one of these operations is performed by the apparatus of any given station platform. This is true because the flow of vehicles through the parking structure is such as to require only one type of operation, either loading or unloading, at any given station platform. Thus, in the structure described, an unloading operation occurs at the receiving station platforms of the upper floors and the ground floor delivery station platform; a loading operation occurs at the delivery station platforms of the upper floors and the ground floor receiving station platform.

Figure 3:
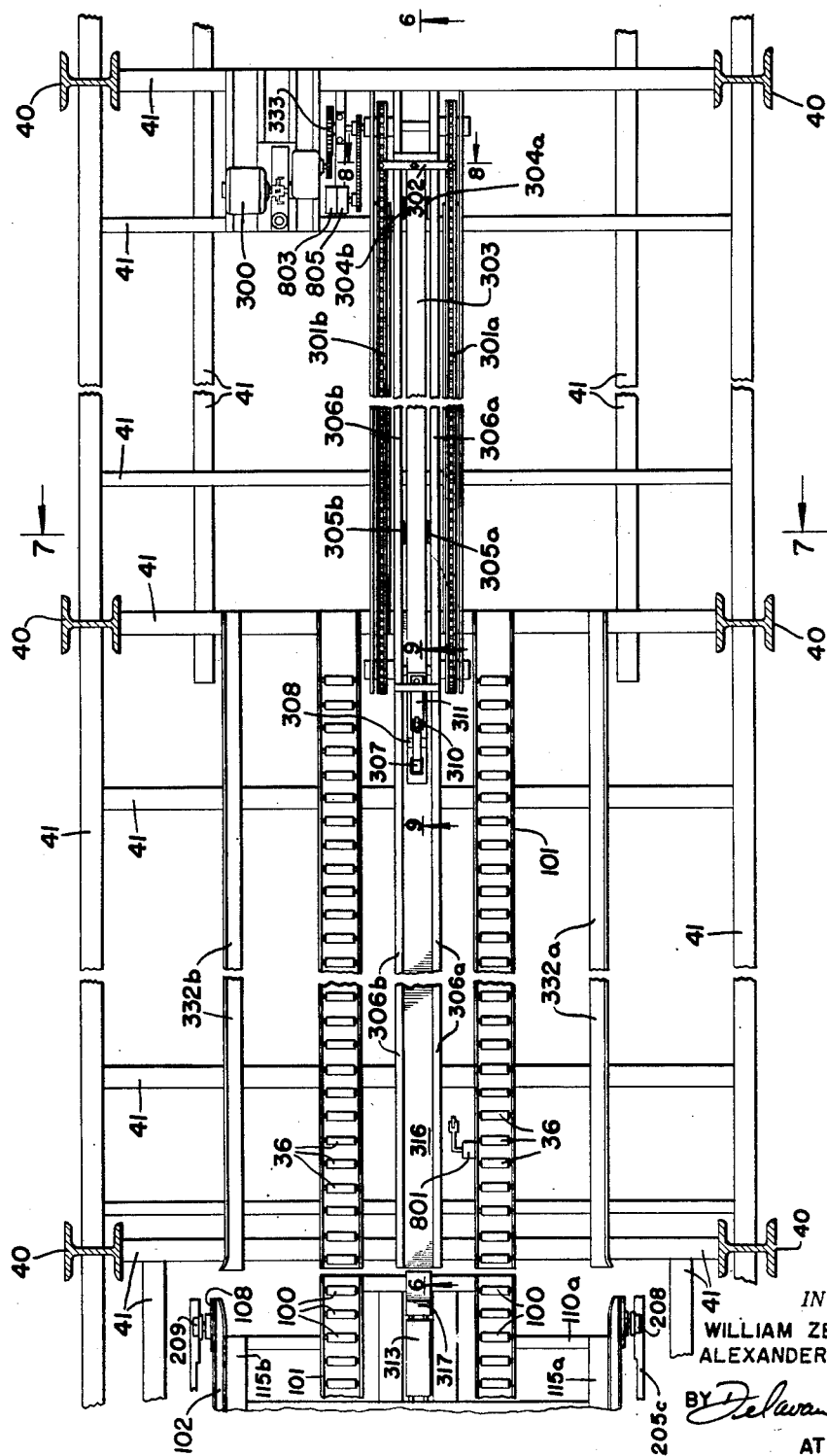
Figure 3 is a plan view of a receiving station and accompanying mechanisms and is a view on line 3—3 of Fig. 1.

The loading and unloading operations are carried out through the cooperation of two discrete mechanisms. The first of these is to be found at each station platform and adjoining parking space as shown in Fig. 3. The second is attached to the bottom of the carriage and is energized from cooperating mechanisms located in the hatchway framework at each floor level.

The first mechanism as shown in Fig. 3, a motor 300 called the "ram drive" motor, energizes a pair of endless chains 301–a and 301–b through a gear reduction, 333. Engaged with links of both chains 301–a and 301–b is a link bar 302 in Figs. 3 and 8. In these figures, it may be seen that the center of the link bar 302 is affixed to one end of a square-sectioned ram 303. This ram, 303, is suspended on four guide rollers 304–a, 304–b, 305–a and 305–b. These guide rollers operate in a pair of guide channels 306–a and 306–b, which carry the ram 303 in a direction parallel with the endless chain 301–a and 301–b.

In Fig. 9, there is shown a pawl 307, hinged about a pin 308 affixed near the end of the ram 303 far from the link bar 302. The pawl 307 is fashioned with two engaging rollers 309 and 310. The engaging roller 310 is spring loaded by a cantilever spring 311 fixed with respect to the ram.

The second mechanism may be seen by referring to Figs. 2 and 5. There, is shown a locking pin 312 and a pawl engagement stage 313. While the carriages are being moved up and down the hatchways, it is necessary to prevent any movement of the dolly and automobile on the carriage, for it is to be noted that rollers 100 would otherwise allow free movement of the dolly along the carriage. A locking arrangement between the carriage framework and the dolly is therefore provided and may be seen with reference to Figs. 10 and 11. When a dolly, such as 314, is resting upon the carriage as shown in Fig. 10, a locking ring 315, fixed to the underside of the dolly, will be engaged by the locking pin 312. Similarly, in Fig. 5 may be seen a second locking pin 312–a which will engage an appropriately positioned second locking ring on the dolly. Thus, there are provided two locking points holding the dolly and automobile in a fixed position with respect to the carriage.

When the carriage has been leveled in the manner previously described, the carriage framework will be exactly level with the corresponding station platform. That is, the rollers 100 and 36 will be in horizontal alignment, allowing movement of the dolly over carriage rollers 100 and station platform rollers 36.

Assuming that a dolly is to be unloaded from a carriage, the ram 303 is made to travel towards the carriage by operation of the ram drive motor 300 and the endless chains 301–a and 301–b. The leveling of the carriage with the station platform is such that the ram may continue its travel to the carriage, finally achieving the position shown in Fig. 10. In the travel of ram 303 towards the carriage, the cantilever spring 311 will tend to make the idler 309 on pawl 307 follow the surface of a guide plate 316 on the station platform, and a guide plate 317 on the carriage 23. At a point x, in Fig. 10, the guide plate 317 on the carriage no longer provides a surface for the roller 309 of the pawl 307; pawl 307 will therefore be retracted to the position shown in Fig. 10 through the action of the cantilever spring 311.

The next step in the withdrawal of the dolly from the carriage is shown in Fig. 11. A release shaft, 318, is moved to the left as shown in Fig. 11, and bell cranks 319, 320 and 321 rotate in a clockwise direction. Clockwise rotation of bell crank 319 will withdraw the engaging pin 312 from the corresponding locking ring 315 on the dolly. Simultaneously, the clockwise rotation of the bell cranks 320 and 321 will cause the engagement stage 313 to rise to a new position on a horizontal level with the guide plates 316 and 317. The upward movement of the engagement stage causes the pawl 307 to engage the retainer 322 affixed to the bottom of the dolly over the pressure of cantilever spring 311. Similarly, the other engaging pin 312–a is withdrawn from its corresponding dolly locking ring; at this point, the movement of the dolly will be controlled solely by the pawl 307 and the ram 303.

Next, the ram 303 is withdrawn to the right by reversing the ram drive motor 300 and therefore reversing the travel of the endless chains 301–a and 301–b. The pawl 307, attached to the ram 303 and now engaged with the dolly, will withdraw the latter over rollers 100 of the carriage to rollers 36 of the station platform, until the dolly and the automobile thereon are completely removed from the carriage to the station platform position.

From the station platform position, corresponding, for example, to 42 in Fig. 1, the dolly and automobile may further be transferred to other portions of the parking level by suitable means, as previously outlined.

It has been shown that the release shaft 318 must be moved transversely to the left, when the dolly and automobile are to be unloaded from the carriage. The movement of shaft 318 to the left is restrained by the compression of a spring 323, operating against a nut 324 threaded to the end of shaft 318. The compression of spring 323 is overcome by rotation of a torsion shaft 325 fixed to the center bell of bell crank 319 in Figs. 2, 5, 11 and 13. The torque on shaft 325 is applied from a crank arm 326 in Figs. 4, 13 and 14. The crank arm 326, the shaft affixed thereto 325 and the bell crank 319, are all attached to the underside of each of the carriages.

While the carriage is in a levelled position with the adjacent station platform, and when the unloading operating sequence has reached the point for withdrawal of the locking pins 312 and 312–a and engagement of the pawl 307, an electric motor 327, called the "dolly pin actuator" motor, starts. Motor 327, in Fig. 14, drives through a gear box 328 to a crank 329, and drag link 330 causes lateral movement of a "cross-head" cam 331 from a position "m" to a position "n." The cross-head cam 331 and its energizing system are mounted upon the framework of the parking structure. With the carriage in levelled position, the crank 326, carried on the underside of the carriage, will be in an appropriate position for engagement with the face of the cam cross-head 331. At the time the dolly locking pins 312 and 321–a are to be retracted, and the engagement stage 313 is to be raised, the motor 327 is energized, moving the cross-head cam 331 to the position "n" and the crank 326 from position "m'" to position "n'." Movement of crank 326 applies a torque to shaft 325, causing clockwise rotation of bell crank 319. This, in turn, moves the shaft 318 in direction compressing spring 323, and the desired unlocking of the locking pins 312 and 312–a and upward movement of the engagement stage 313 will be achieved.

When the unloading operation is complete, the dolly pin actuator motor 327 is reversed in rotation; the cross-head cam 331 will return to its previous position "m," the crank 326 to its normal position "m'," restoring the locking pins 312 and 312–a and the engagement stage 313 to their former position.

When the dolly is withdrawn from the carriage to the station platform, it is guided to provide the correct motion over the station platform rollers 36 by two L section guides 332–a and 332–b, shown in Figs. 3 and 7. These guide rails 332–a and 332–b act in cooperation with the carriage from guide rails 115–a and 115–b, in the withdrawal of the dolly from the carriage by the ram 303.

It is seen from the foregoing that the position of the dolly is at all times locked with respect either to the carriage, by the dolly locking pins 312 and 312–a, or to the withdrawal apparatus, by the ram 303 and its pawl 307.

When a loading operation is to be performed, as in the upper floors delivery station platform and the down hatchway, or at the ground floor receiving station platform, an operation is performed exactly the reverse as given above for the unloading operation. Thus, as shown in Fig. 5, an engagement stage 313–a is provided to allow the performance of the loading and unloading functions at either end of the carriages. The action of the pawls and operating rams in the loading operation are in reverse sequence to the unloading operation already described.

In brief, it may be assumed that a dolly and automobile are on floor level III, delivery station platform in position 32, as shown in Fig. 1. An empty carriage will arrive in the "down" hatchway adjacent to this position. Floor leveling motor 200 (common to the leveling apparatus of both the "up" and "down" hatchways of floor level III) is energized and the carriage brought level. A dolly pin actuator motor is started, withdrawing the dolly locking pins and raising the engagement stage. The dolly is already engaged by a pawl and ram corresponding to 307 and 303. The ram is driven by a ram drive motor, moving the dolly over the station platform and carriage rollers until the dolly is properly positioned on the carriage; the pawl corresponding to 307 will remain in engagement as the engagement stage of the carriage has been raised. After the dolly and automobile are properly positioned, the dolly pin actuator motor will engage the locking pins with the dolly and lower the engagement stage. The pawl will thereupon be disengaged from the dolly and the ram may be retracted to the station platform. Thereupon, return of the carriage to the chain beam by the leveling apparatus will allow the carriage to continue the descent and the dolly and automobile may be returned to the ground floor.

It is to be remembered that at the ground level, the receiving station platform will operate to load the dolly and automobile onto the carriage and the delivery station platform will unload the dolly and automobile from the carriage. This is the reverse of the corresponding operations for the respective receiving and delivery station platforms on the upper floor levels.

*Upper carriage transfer*

The conveyor carriages such as 23 are to be transferred from the "up" hatchway to the "downward" hatchway at the upper end of the conveyor chain travel in the "up" hatchway. The operation of the upper carriage transfer may be seen with reference to Figs. 15, 16, 17 and 18.

The general plan of operation at the upper carriage transfer is to lift the carriage from the chain beam, allowing gear racks located at the top of the carriages to engage a pair of horizontally traveling chains; simultaneously, idler pulleys located at the bottom of the carriage will be engaged by horizontal guide channels, the latter acting as rails conducting the carriage from the "up" hatchway to the "down" hatchway. Upon reaching the "down" hatchway, the carriage is again set to rest on a chain beam and the vertical conveyor chains.

In the performance of the upper carriage transfer, a carriage such as 23 reaches the upper transfer level: a position one floor above the highest parking level to be employed. Thus, in Fig. 17, carriage 23 will be lifted by the chain beam 25–a and vertical conveyor chains 24–a and 24–b to the level shown in the "up" hatchway.

Leveling apparatus, as previously described with reference to the floor-leveling arrangement, operates to lift the carriage 23 from the chain beam 25–a, to the position shown in Fig. 17. This leveling apparatus includes an upper transfer leveling motor 400 driving through differentials 401 and 402 to gear boxes 403, 404, 405 and 406. After the carriage 23 comes to rest at the upper transfer level, motor 400 will operate through these linkages to cause four cam cranks (two of which may be seen in Fig. 17 and are identified as 405–c and 406–c), lifting the carriage from the chain beam. These cam cranks are similar to 205–c and 206–c, and they engage idlers 207 and 208 on the frame of carriage 23. The corresponding idlers on the other side of the carriage 209 and 210, are similarly engaged by cam cranks. When the carriage 23 is lifted by the leveling apparatus, gear racks 30–a and 30–b engage a pair of endless chains 36–a and 36–b in Figs. 16 and 17. These chains are called the upper transfer drive chains.

The cam cranks, described above, such as 405–c and 406–c, perform a dual function. In addition to lifting the carriage to engagement with the upper transfer chains as described, the cams rise into alignment with openings in a pair of horizontal guide channels 37–a and 37–b. These openings interrupt the continuity of the horizontal guide channels and are provided to clear the idlers 207, 208, 209 and 210 as the latter are brought into horizontal alignment with the channels. The upper position of the cam crank supplies horizontal continuity with the horizontal guide channels, providing a sufficiently continuous horizontal path for the idlers 207, 208, 209 and 210, as well as the idlers 29–a and 31–a. In Fig. 18, the engagement provided between the idlers, as 31–a, and the horizontal guide channels 37–a and 37–b, is clearly displayed.

At the same time that the upper transfer leveling arrangement described raises carriage 23 to engagement with the upper transfer chains 36–a and 36–b, the leveling apparatus in the "down" hatchway is brought to the raised position, providing horizontal continuity for the passage of the carriage idlers over those portions of the guide rails 37–a and 37–b located in the "down" hatchway. The same upper transfer leveler motor 400, energizes both levelers through the gear drives 401 and 402. When the upper transfer chains 37–a and 37–b have brought the carriage 23 to the "down" hatchway position, idler 31–a will be in a proper place to engage the vertical alignment guide 26–b of the "down" hatchway.

The upper transfer chains 36–a and 36–b are caused to travel in a clockwise direction, as shown in Fig. 17, by virtue of an upper transfer drive motor 411 operating through gear drives 412–a and 412–b. Each of the chain groups 36–a and 36–b is composed again of two chains coupled by space bars 413–a and 413–b, which actually engage the teeth 30–a and 30–b atop the carriage.

When the carriage gear racks, 30–a and 30–b, have engaged the upper transfer chains 37–a and 37–b, an upper transfer drive motor, 411, starts. Motor 411 imparts motion to the transfer chains 36–a and 36–b, driving the carriage 23 from the "up" hatchway position, over the guide channels 37–a and 37–b, to the position shown dotted in Fig. 17 for carriage 23. There are discontinuities and openings of the horizontal guide channels 37–a and 37–b, for example, at the intersections of the latter with vertical guide channels such as 26–a and 26–b. These discontinuities are immaterial to the transfer of the carriage from the "up" to the "down" hatchway, as four idlers, such as 207, 208, 29–a and 31–a, are interspersed over each side of the carriage. The idlers are so arranged with respect to the horizontal guide channel discontinuities that at least three idlers, in horizontal alignment on the carriage, will constantly be engaged by the guide channels. As a result, the passage of one idler over an opening as is shown at 407 and 408 in Fig. 15, or at the intersection 414 of vertical guide rail 26–b, will not interrupt the transfer of the carriage.

When the carriage reaches the ultimate position in the "down" hatchway, the upper transfer leveler motor 400 is reversed, lowering cam cranks such as 409 and 410 to the retracted position. This, in turn, lowers the carriage 23 upon the waiting chain beam 25–b, in the "down" hatchway. At this point, the carriage 23 is once again restored to the support of a chain beam 25–b and the vertical conveyor chains 24–a and 24–b. The carriage may then continue in its downward passage in the "down" hatchway. Idlers 31–a and 31–b will now be engaged in the vertical alignment guide rails 26–b, and loading and unloading operations may proceed as described.

The vertical conveyor chains 24–a and 24–b are at rest during the upper carriage transfer operation. The upper transfer proceeds while loading and unloading operations are being carried on over the remainder of the conveyor chains.

*Lower carriage transfer*

The conveyor carriages, such as 23, must be transferred from the "down" hatchway to the "up" hatchway at the lower end of the carriage travel in the "down" hatchway. Details of the lower transfer arrangement may be seen in Figs. 19, 20 and 21.

A lower transfer level, one floor below the lowest level at which cars are to be parked, is provided. As the carriage, 23, approaches this lower transfer level, horizontal guide channels 40–a and 40–b engage the lower idlers 207, 208, 209, 210, 29–a and 31–a of the carriage. The conveyor chains and chain beams will actually travel for a small distance after these idlers make contacts with the horizontal alignment channels. Thus, the chain beam 25–c will come to rest at a position slightly below the position of the carriage, now engaged with the horizontal guide channels 40–a and 40–b, allowing movement of the carriage free from the chain beam 25–c.

At the same time that the idlers 207, 208, etc. are engaged in the horizontal guide channels 40–a and 40–b, the lower set of gear racks 39–a and 39–b of the carriage engage a pair of lower transfer chains 38–a and 38–b, as shown in Figs. 19, 20 and 21. A lower transfer drive motor 500 drives through appropriate linkage and gear boxes 501 and 502, to provide travel of the lower transfer chains 38–a and 38–b. The construction of the lower transfer chains 38–a and 38–b is similar to the construction of the upper transfer chains, previously described. As shown in Fig. 20, these chains will now have imparted to them a clockwise travel, engaging the gear racks 39–a and 39–b and moving the carriage 23 over the horizontal guide channels 40–a and 40–b to the dotted position shown in the "up" hatchway.

When idlers 29–a and 29–b have come into vertical alignment with the vertical aligning guides 26–a, the operation of the lower transfer chains 38–a and 38–b is stopped and the carriage 23 is ready to begin its travel in the "up" hatchway. Appropriate openings provided in the top of the horizontal guide channels 40–a and 40–b allow upward movement of the idlers previously engaged therewith, as the carriage is lifted by the chain beam 25–d and the conveyor chains 24–a and 24–b. The carriage may then continue performing the function outlined in the "up" hatchway.

As in the case of the upper transfer, the lower transfer occurs during a portion of the conveyor chain cycle when the conveyor chains 24–a and 24–b are at rest. This may be at the same time that the loading and unloading operations are proceeding at the various parking levels.

Vertical conveyor motor

Figure 22:
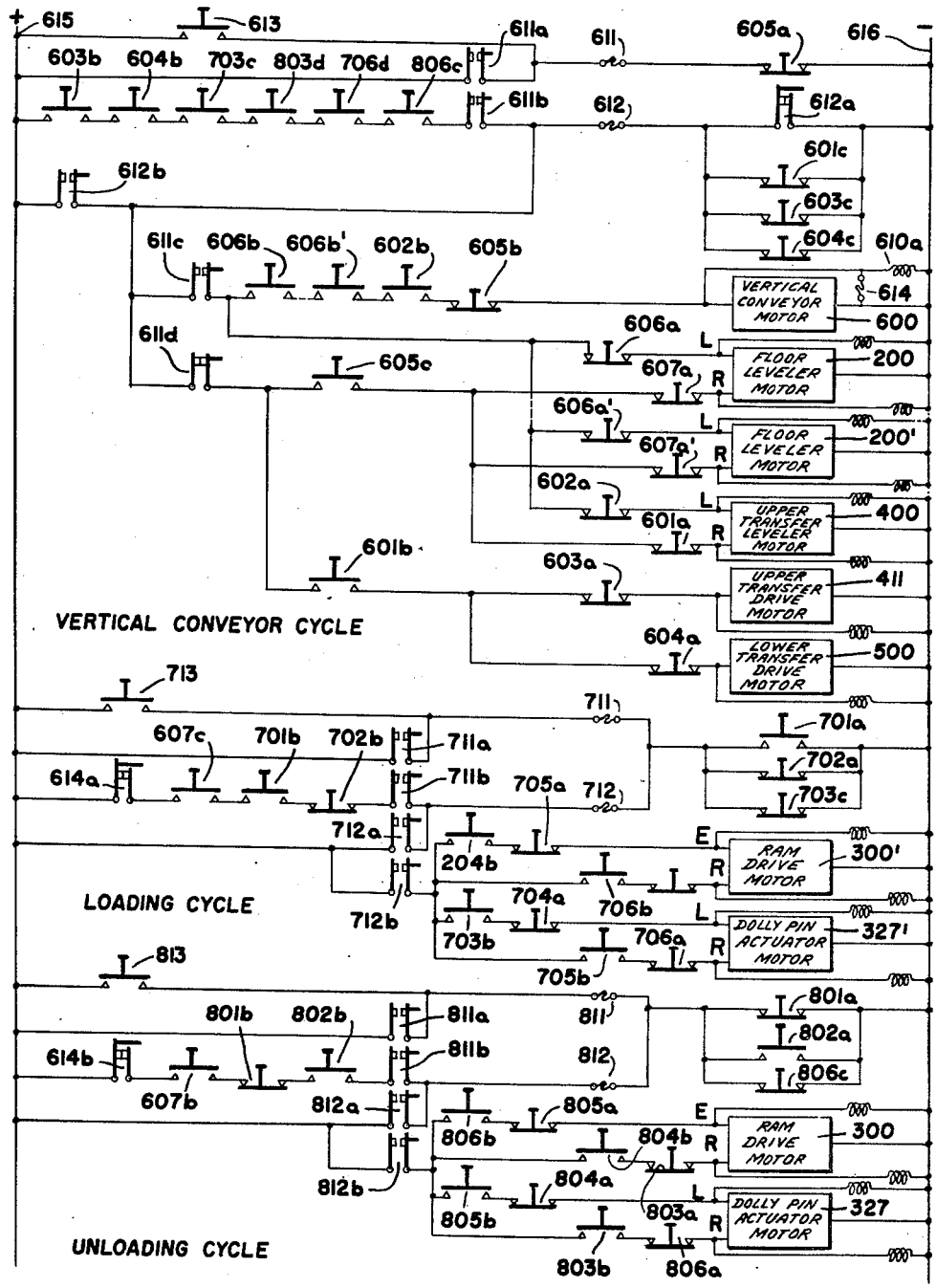
Figure 22 is a schematic diagram of electrical connections according to one embodiment of the invention.

A motor, 600, in Fig. 22 is provided to drive the vertical conveyor chains 24–a and b. Such a motor can drive a shaft 24–c in Fig. 18, causing the large sprocket gears attached thereto to rotate, moving the vertical conveyor chains 24–a and 24–b and providing the desired conveyor chain travel.

Operational sequence

The mechanical construction and operation of individual portions of the vertical conveyor, according to the invention, have been described in detail. In addition, the general operation of the vertical conveyor has been described. The coordination between the various portions of the vertical conveyor and the general operation can best be understood by an analysis of the sequence of operations performed by the vertical conveyor.

In order to provide a starting place for the consideration of conveyor sequence, certain primary conditions must be assumed as follows: the vertical conveyor chains are at rest; the upper carriage transfer has been completed; the lower carriage transfer has been completed; the floor levelers are raised on each floor level; the leveler is raised at the upper carriage transfer; the dolly pin actuating mechanism is de-energized and the dolly locking pins are locked on all floors. When these conditions are met, the vertical conveyor is ready to pass through the first of the operational sequences, the vertical conveyor hoisting cycle.

To set the vertical conveyor into motion, a starting switch is actuated. However, before the vertical conveyor motor can operate and drive the vertical conveyor chains, the closing of a series of protecting interlocks is required. These interlocks provide: that the carriage at the upper transfer level shall have reached the lowering position in the "down" hatchway; that the carriage at the lower transfer level shall have reached the hoisting position in the "up" hatchway; that all loading and unloading rams are in the retracted position; and that the dolly pins are locked. The importance of these interlocks to the safe operation of the vertical conveyor is easily understood. For example, if a carriage at the upper or lower transfer level had not reached the approximate position in the hatchways, this carriage would remain lodged at the transfer level and disablement of the conveyor would result. Similarly, rams left extended into the hatchway would interfere with the passage of carriages therein; dollies not locked to the carriages might roll from the carriages.

Upon initiation of the vertical conveyor cycle through the operation of the starting switch, floor leveler motors, such as 200 and 200', will operate, retracting the levelers at each floor level, and lowering the carriages to the waiting chain beams. At the upper transfer level, the leveler apparatus is similarly withdrawn lowering the carriage in the upper transfer level to the chain beam in the "down" hatchway.

Driven by the vertical conveyor motor, the vertical conveyor chains now move one floor level. Upon having moved one floor level, the vertical conveyor motor will stop and the floor leveler motors and the upper transfer leveler motor will again be energized, raising the floor and upper transfer levelers. As has been shown, this brings the carriages into proper horizontal alignment for loading and unloading operations as well as for the upper carriage transfer. The hoisting cycle of the vertical conveyor is now complete.

As the final step in the vertical conveyor operational sequence, four actions are performed simultaneously. First, the upper transfer drive motor 411, will operate, moving the carriage from the "up" to the "down" hatchway at the upper transfer level in the manner previously described. Second, the lower transfer drive motor 500, will move the carriage from the "down" to the "up" hatchway of the lower transfer level. Third, the loading cycles proceed on each of the floor levels. Fourth, the unloading cycles proceed on each of the floor levels. The third and fourth actions will be considered at length.

To initiate the unloading cycle, certain interlocked conditions must be met. These include: the stoppage of the vertical conveyor motor; the floor levelers must be raised; a dolly to be unloaded must be located on the vertical conveyor carriage; and the unloading station platform must be clear to accept the dolly.

Providing that the unloading cycle interlock conditions are met, the ram drive motor, as 300, will be energized, driving the ram 303 outward, onto the carriage. At the same time, the dolly pin actuator motor 327 will also be energized, lowering the dolly locking pins as 312 and 312–a and raising the engagement stage 313. The ram, now engaged with the dolly, can withdraw the dolly to the adjacent station platform by reverse operation of the ram drive motor 300. The ram is thus returned to the retracted position. The dolly pin actuator motor 327 will then be energized in the opposite direction, raising the dolly locking pins 312 and 312–a and lowering the engagement stage 313. The unloading cycle is now complete.

Loading cycles occur simultaneously with the unloading cycles at other portions of the parking structure. In order for the loading cycle to commence, certain interlock conditions must here also be met. Among these: the vertical conveyor motor must be stopped; the floor levelers of the adjacent floor leveling apparatus must be raised; a dolly to be loaded must be located on the loading station platform; and the vertical conveyor carriage must be clear to accept the dolly. If these conditions are met, the loading cycle can continue.

The loading cycle provides for energizing the dolly pin actuator motor as 327' in Fig. 22, unlocking the dolly pins and raising the ram engagement stage. The ram drive motor 300' will be energized and the ram, together with the dolly and automobile thereon, will be moved outward onto the awaiting vertical conveyor carriage. The dolly pin actuator motor 327' is then reversed, locking the dolly pins and lowering the ram engagement stage. The ram drive motor is then reversed. the ram returning to the retracted position. The dolly and automobile remain locked to the vertical conveyor carriage, awaiting the next operation of the conveyor stage. The loading cycle is then complete.

It is to be remembered that unloading cycles are performed at the upper floor receiving station platforms and the ground floor delivery station platform; while loading cycles are performed at the upper floor delivery station platforms and the ground floor receiving station platform.

Upon the completion of the four final simultaneous actions: the upper and lower carriage transfers, and the loading and unloading cycles, one complete cycle of the vertical conveyor is ended.

Electrical control system

While the invention is described with reference to a direct current supply, it is obvious that an alternating current supply may be used.

To carry out the operational sequence described, proper switching and relay arrangements must be provided. Such arrangements are shown on the electric schematic diagram of the conveyor system, Fig. 22.

The required interlocking arrangements and electrical sequences are controlled by three groups of limit switches. These groups are: limit switches associated with the vertical conveyor hoisting cycle and the upper and lower carriage transfers; limit switches associated with the unloading cycle; and limit switches associated with the loading cycle.

The limit switches associated with the vertical conveyor cycle and upper and lower carriage transfers, include limit switch 601, actuated by the upper transfer leveler when this leveler is in a raised position. Limit switch 602 is also actuated by the upper transfer leveler when the leveler is lowered. Limit switches 601 and 602 may be seen with reference to Figs. 1 and 15. Limit switch 603 is actuated by the carriage when the carriage has been transferred to the "down" hatchway at the upper carriage transfer and is ready to be lowered. This limit switch may be seen in Figs. 1, 15 and 17. Limit switch 604 is actuated by a carriage when it has been transferred to the "up" hatchway at the lower transfer level and is ready for hoisting. Limit switch 604 may be seen in Figs. 1, 19 and 20. Limit switch 605, Figs. 1, 15 and 17, is actuated by a carriage in the "up" hatchway at the upper transfer level when the carriage is in a position preparatory to the upper carriage transfer. A group of limit switches, of which 606 in Figs. 1 and 2 is typical, are discretely actuated by individual floor leveling apparatus when the floor leveler is in the lowered or retracted position. Limit switches, of which 607, Figs. 1 and 2, is typical, are similarly located with each of the floor leveling apparatus but are actuated when the apparatus is in the raised position.

An unloading cycle is provided for each station platform at which an unloading operation is to be performed. Limit switch 801, Figs. 1 and 3, is located in the unloading station platform and is actuated by a dolly when the dolly has been unloaded to the awaiting station platform. Limit switch 802, Figs. 1, 2 and 4, is located in the adjacent hatchway and is actuated by the dolly on the vertical conveyor carriage, before its withdrawal to the station platform. Limit switch 803, Figs. 1 and 2, is operated by the unloading ram mechanism when the ram is fully retracted. Limit switch 804, Figs. 1 and 2, is in the adjacent hatchway and is actuated by the dolly pin actuator mechanism when the pins are lowered or withdrawn. Limit switch 805, Figs. 1 and 3, is operated by the unloading ram mechanism much in the manner of limit switch 803, but is actuated when the ram is fully extended to the carriage. Limit switch 806, Figs. 1 and 2, is located in the adjacent hatchway; but as distinguished from limit switch 804, 806 is actuated when the dolly locking pins are in the raised or locked position.

A loading cycle is provided at each station platform where loading is to be performed. The loading cycles will be the same for each of these station platforms and any one may be chosen as typical. At a typical loading station platform, the following limit switches are provided. Limit switch 701, Fig. 1, is actuated when a dolly is located in the loading station platform. Limit switch 702, Figs. 1, 2 and 4, is located in the adjacent hatchway of the vertical conveyor and is actuated when the dolly has been loaded on the vertical conveyor carriage and is in the proper position for hoisting or lowering. Limit switch 703, Fig. 1, is actuated by the ram mechanism when this mechanism has been completely retracted. Limit switch 704, Fig. 1, is located in the adjacent hatchway and is actuated by the dolly pin actuator mechanism when the dolly locking pins are withdrawn or lowered. Limit switch 705, Fig. 1, is similar to limit switch 703, but is actuated by the ram mechanism when the ram is fully extended to the carriage. Limit switch 706, Fig. 1, is located in the adjacent hatchway; but as distinguished from limit switch 704, 706 is actuated when the dolly pins are in the raised or locked position.

It is to be understood that all of the limit switches cooperating with the loading and unloading cycles are utilized at each of the station platforms where these operations are to be carried on. Only one loading and one unloading cycle is here considered, as all are similar.

The limit switches above are equipped with one or more contacts. These contacts will bear a letter suffix *a*, *b*, etc., indicating that they are operated by the limit switch bearing the reference number. Thus, 601–*a* is a contact of limit switch 601. With regard also to the operative position of the limit switch contacts, "normally open" or "normally closed," the normal position is the unactuated position. In Fig. 22, the limit switch contacts are shown in the normal position.

*Vertical conveyor hoisting and transfer cycle*

The conditions at the start of the vertical conveyor cycle will be as described with reference to the operational sequence. The vertical conveyor is at rest. The loading and unloading rams, such as 303, are fully retracted on all floor levels; thus, limit switches such as 703 and 803 are actuated. At the start, the dolly pin actuators, as shown in Fig. 14, are in such position that all dolly pins as 312 and 312–*a* are in the raised or locked position; thus, limit switches as 706 and 806 will be actuated. The floor leveling apparatus, as in Fig. 12, are raised on all floors; limit switches corresponding to 607 are actuated. The upper transfer leveling apparatus is raised; limit switch 601 is actuated. The carriage located at the upper transfer level must have completed the transfer to the "down" hatchway; limit switch 603 is actuated. The carriage located at the lower transfer level must have completed the transfer to the "up" hatchway; limit switch 604 will be actuated. There must be no carriage in the "up" hatchway at the upper transfer level; limit switch 605 is thus in the normal position.

To initiate the vertical conveyor cycle, a momentary contact switch 613 in Fig. 22 is closed, indicating that the vertical conveyor is to be moved one floor level. Contact 605–*a* is closed, as limit switch 605 is in the normal position when there is no carriage at the "up" hatchway upper transfer level. Thus, power will be supplied from direct current supply circuits 615 and 616; through switch 613, to the coil of relay 611. Contact 611–*a* of relay 611 closes, locking relay 611 closed after switch 613 is released. Limit switches 603, 604, 703, 803, 706 and 806 will be actuated when the required starting conditions are met; these switches providing also the interlocks against inopportune starting of the cycle. The coil of relay 612 will thereupon be energized through the now closed contact 611–*b* and through the series of closed interlock contacts, 603–*b*, 604–*b*, 703–*c*, 803–*d*, 706–*d*. Contact 612–*a* provides a negative path to the coil of relay 612 as a time delay is applied to these contacts, arresting their opening. Contact 612–*b* must necessarily remain closed during subsequent operations of the vertical conveyor hoisting and transfer cycle.

The floor leveling motors, such as 200, and the upper transfer leveling motor 400, are equipped with one negative and two positive leads; this selection of polarities, however, being arbitrary. Only one of the positive leads is energized at any given time; the direction of motor rotation is dependent upon which of these leads is energized. If the motor lead marked "L" is energized, the leveler motors will rotate in a direction lowering the leveling apparatus; conversely, if the terminal marked "R" is energized, the leveling motors will be rotated in a direction raising the leveling apparatus. Although circuits for only two floor leveler motors are shown, a floor leveler motor is required for each parking level.

When relay 612 is energized, a circuit is completed to the "L" terminal of all floor leveler motors, such as 200, through contacts 612–*b*, 611–*c*, and the normally closed contacts such as 606–*a*, and 606–*a'*. Limit switches 606 and 606' will be in the normal position as the floor levelers have been assumed to be in the raised position. The "R" leads of the floor leveler motors will not be energized as limit switches 607 and 607' are actuated.

At the same time, the upper transfer leveler motor is energized through contacts 612–*b*, 611–*c*, and 602–*a*. Limit switch 602 will be in the normal position and contact 602–*a* closed, as the upper transfer leveler has been assumed to be in the raised position. The "R" terminal will not be energized as limit switch 601 is actuated.

As the motors 200, 201', etc., and 400 rotate, the floor levelers and upper transfer leveler will be lowered, seating the carriages on the various vertical conveyor chain beams. Seating of the carriage at the upper transfer level in the "down" hatchway returns limit switch 601 to normal position, closing contact 601–*c*. The time delay of contact 612–*a* now allows this contact to open and relay 612 will be held operated through contact 601–*c*. As relay 612 has already been shown to be operated, contact 612–*a* will be open. Limit switch 602 will be actuated by the lowering of the upper transfer leveler. Actuation of limit switch 602 opens contact 602–*a*, stopping the upper transfer leveler motor 411. The retraction of the floor levelers returns limit switches, such as 607, to normal. Limit switches as 606 are now actuated, opening the circuit to the "L" contact of the floor leveler motors, as 200; the motors will stop.

Contacts 606–*b* and 602–*b* together with corresponding contacts as 606–*b'* will be closed by the aforementioned actuation of limit switches 606 and 602. Limit switch 605 will be in the normal position; no carriage is located in the upper transfer level "up" hatchway. The vertical conveyor motor 600 will thus be energized by a circuit through contacts 611–*c*, 606–*b*, 606–*b'*, etc., 602–*b* and 605–*b*. The vertical conveyor motor 600, mechanically linked to the vertical conveyor chains 24–*a* and 24–*b*, rotates and advances the vertical conveyor chains and carriages one floor level.

Limit switches 602 and 604 return to the normal position as carriages are removed by the vertical conveyor chains from the upper transfer level "down" hatchway and lower transfer level "up" hatchway. Advance of the vertical conveyor one floor also actuates limit switch 605, as the carriage formerly on the highest parking level in the "up" hatchway is now brought to the upper transfer level in the "up" hatchway. Actuation of limit switch 605 opens contact 605–a, de-energizing and unlocking relay 611. De-energization of relay 611 opens relay contact 611–c, stopping the vertical conveyor motor 600.

With the de-energization of relay 611 and the return of contact 611–d to the normal closed position, actuation of limit switch 605 completes the circuit through 611–d and 605–c to the "R" leads of all floor leveler motors and of the upper transfer leveler. Limit switches 601, 607, 607', being in the normal position, contacts 601–a, 607–a and 607–a' will be closed.

All floor leveling motors as 200 and 200' will be raised separately and the carriages will be lifted from the vertical conveyor chain beams. Limit switches corresponding to 606 are now returned to normal, and those corresponding to 607 are actuated. Actuation of limit switch 607 stops the floor leveler motor 200 when the raised leveler position is reached. Simultaneously, the upper transfer leveler raises; the carriage thereon is lifted from the vertical conveyor chain beam in the "up" hatchway and is engaged with the upper transfer chains, as described. The completion of the upper transfer leveling returns limit switch 602 to normal and actuates limit switch 601.

Actuation of limit switch 601 closes contact 601–b, completing the circuit to upper and lower transfer drive motors. The circuit for the upper transfer drive motor 411 is through normally closed contacts 611–d, the now closed contact 601–b, 603–a, to the upper transfer drive motor 411. In the case of the lower transfer drive motor 500, the circuit passes through the now closed contacts 601–b, the closed contact 604–a, to the lower transfer drive motor. Limit switches 603 and 604 will be in the normal position as carriages have not yet been transferred at either the upper or lower transfer level.

The upper carriage transfer chains, driven by the upper transfer drive motor 411, at the upper transfer level from the "up" hatchway to the "down" hatchway. Limit switch 605 is thus returned to the normal position. When the upper transfer has been completed, limit switch 603 is actuated, opening contact 603–a and stopping the upper transfer drive motor.

The lower transfer chains move the carriage at the lower transfer level from the "down" hatchway to the "up" hatchway. When the carriage transfer has been effected, limit switch 604 is actuated. Actuation of limit switch 604 opens contact 604–a, stopping the lower transfer drive motor.

Actuation of limit switches 603 and 604 open contacts 603–c and 604–c, respectively. As contacts 601–c and 612–a are already open, the relay 612 will be de-energized, opening contacts 612–b. The vertical conveyor hoisting and transfer cycle is then complete.

*Unloading cycle*

To provide the proper conditions for initiation of the unloading cycle, the vertical conveyor chains must be at rest. To insure that this condition is met, a relay 614 has its coil connected in parallel with the vertical conveyor motor 600. When the vertical conveyor is in operation, relay 614 will be energized, opening contact 614–b, which will be employed as an interlock.

Other conditions are required to start the unloading cycle: the floor levelers must be raised; the limit switch, as 607, associated with the station to be unloaded must be actuated, closing contact 607–b. The station platform to which the dolly and automobile are to be unloaded must be unoccupied; thus, limit switch 801 must be in the normal position and contacts 801–a and 801–b are closed. A dolly, to be unloaded, must be located on the adjacent vertical conveyor carriage, actuating limit switch 802. If there is no dolly on the carriage, contact 802–b will be open and the unloading cycle cannot be initiated. The dolly pin actuator mechanism must be in a position such that the dolly locking pins are raised; limit switch 806 must be actuated and contact 806–b closed. The ram must be in a retracted position; limit switch 803 will be actuated and contact 802–a is open.

To initiate the unloading cycle, momentary closing switch 813 is operated, indicating that a dolly is to be unloaded from the adjacent carriage. The coil of relay 811 is energized through the switch 813 and contact 801–a. Relay 811 locks in through contact 811–a; contact 811–b closes.

Closing of contact 811–b energizes the coil of relay 812 through contact 801–a, provided the interlock contacts 614–b, 607–b, 801–b and 802–b, previously described, are closed. Relay 812 locks through contact 812–a, and contact 812–b must remain closed during the remainder of the unloading cycle.

The ram drive motor 300 is provided with one negative and two positive leads. As before, the choice of polarity is arbitrary. Only one of the positive terminals is energized at one time. One, marked "E," if energized, causes the ram to extend to the carriage. The second terminal, marked "R," if energized, reverses the rotation of the ram drive motor, retracting the ram from the carriage to the unloading station. Similarly, the dolly pin actuator motor 327 is equipped with one negative and two positive leads. One lead, marked "L," is energized when the dolly pin actuator motor is to lower or unlock the dolly locking pins. Energizing instead the lead "R," reverses the rotation of the dolly pin actuator motor, raising the dolly locking pins to the locking position.

The closing of contact 812–b provides a path through contacts 806–b and 805–a to the "E" terminal of the ram drive motor 300, extending the ram to the carriage. Limit switch 805 will have been in the normal position as the ram is not extended and 806 will be actuated as the dolly locking pins were raised as a condition precedent. Conversely, contact 804–b will be open; the dolly pins being raised, the limit switch 804 is in the normal condition.

When the ram is fully extended to the carriage, limit switch 803 returns to normal, limit switch 805 is actuated. Actuation of limit switch 805 opens contact 805–a, stopping the ram drive motor.

Actuation of limit switch 805 also closes contact 805–b. A path is then provided through contacts 812–b, 805–b and 804–a to the "L" terminal of the dolly pin actuator motor 327. 804–a will be in the closed position as limit switch 804 is in the normal position when the dolly pins are raised. Energization of the dolly pin actuator motor 327 lowers the dolly pin mechanism unlocking the dolly from the carriage. Simultaneously, the ram engagement stage is raised. When the operation of the dolly locking mechanism is complete, limit switch 806 returns to the normal position and limit switch 804 is actuated. Actuations of limit switch 804 opens contact 804–a, stopping the dolly pin actuator motor in the lowered position.

Actuation of limit switch 804 simultaneously completes the circuit from contact 812–b, 804–b now closed and 803–a to the "R" terminal of the ram drive motor 300. Contact 803–a is in the normally closed position as the ram is extended to the carriage.

This energization of the ram drive motor 300 retracts the ram, pulling the dolly and automobile from the carriage to the awaiting unloading station. Upon completion of this operation, limit switches 802 and 805 return to normal and 801 and 803 are actuated. Limit switch 801 will be actuated by the dolly now in the unloading station, opening contact 801–a. The dolly no longer being on the vertical conveyor carriage, the limit switch 802 will have returned to the normal position, opening contact 802–a. Actuation of limit switch 803 stops the ram drive motor by opening contact 803–a.

Operation of limit switch 803 also completes the circuit from contact 812–b, 803–b now closed and 806–a to the "R" terminal of the dolly pin actuator motor 327. Limit switch 806 is in the normal position, with contact 806–a closed, as the dolly pins have been in the lowered position.

Energization of the dolly pin actuator motor 327, raises the dolly locking pins and lowers the engagement stage. Upon the completion of this operation, limit switch 804 returns to normal and limit switch 806 is actuated. Actuation of limit switch 806 opens normally closed contact 806–a, stopping the dolly pin actuator motor 327.

Actuation of limit switch 806 also de-energizes relays 811 and 812. As contacts 801–a and 802 have already been described as open, opening of contact 806–c will de-energize the coils of both these relays, and the unloading cycle is complete.

*Loading cycle*

As in the case of each of the preceding cycles, a series of interlocks are provided which must be satisfied in order to initiate the loading cycle. One such interlock requires that the vertical conveyor motor 600 must be at rest. The relay 614, previously described as being parallel with vertical conveyor motor 600, has an interlock contact 614–a in the loading cycle. Similarly, floor levelers must be raised. When the floor leveler of the floor at which the loading to be executed is raised, the associated limit switch, for example 607, is actuated and interlock contact 607–c in the loading cycle will be closed. A dolly must be at the loading station waiting to be loaded upon the carriage; limit switch 701 will, therefore, be actuated, closing contact 701–b. The vertical conveyor carriage to receive the dolly and automobile must be unoccupied; limit switch 702 will be in the normal position, contact 702–b is closed. In addition, the dolly pins must be in the raised position; limit switch 706 will thus be actuated. The ram must be in the retracted position; limit switch 703 is actuated.

To initiate the operation of the loading cycle, momentary closing switch 713 is operated, indicating that a dolly is to be loaded onto the adjacent unoccupied carriage. Closing switch 713 energizes the relay 711 through contract 701–a. Limit switch 701 is actuated by the presence of a dolly at the loading station. If no dolly is there, ready to be loaded, the loading cycle will not be initiated. Upon closing, relay 711 locks closed through contacts 711–a.

Closing of relay 711, also closed contact 711–b. Assuming that the interlock contacts 614–a, 607–c, 701–b and 702–b are all closed, the coil of relay 712 will be energized. This circuit is made through the interlocks, contact 711–b now closed, and 701–a closed. Relay 712 locks closed through contacts 712–a. Contact 712–b is also closed, and so remains during the entire loading cycle.

As in the case of the unloading cycle, the ram drive motor 300′ and dolly pin actuator motor 327′ both have two positive terminals "E"—"R" and "L"—"R," respectively, depending on whether the ram is to be extended or retracted, or the dolly locking pins to be lowered or raised. The reversing control of these motors was described with reference to motors 300 and 327, and further detail is believed unnecessary.

Closing of relay 712 completes the circuit through contact 712–b, 703–b and 704–a to the "L" terminal of the dolly pin actuator motor 327′. Limit switch 703 is actuated and limit switch 704 is in normal position, as the ram mechanism is retracted and the dolly pin actuator mechanism is raised.

Operation of the dolly pin actuator motor 327′ will lower the dolly locking pins and raise the engagement stage. When this operation is complete, limit switch 706 returns to the normal position and limit switch 704 is actuated. Actuation of limit switch 704 opens contact 704–a, stopping the dolly pin actuator motor in the lowered position.

Operation of limit switch 704 also provides a circuit from contact 712–b, through 704–b now closed, and 705–a to the "E" terminal of ram drive motor 300′. Limit switch 705 is in the normal position with contact 705–a closed as the ram drive mechanism is not yet extended.

The ram is then extended by operation of ram drive motor 300, pushing the dolly onto the carriage. Limit switches 701 and 703 are thereby returned to normal and limit switches 702 and 705 are actuated. Actuation of limit switch 705 opens the circuit to the ram drive motor terminal "E," stopping the ram drive motor.

Operation of limit switch 705 also completes a circuit from 712–b, through 705–b now closed and 706–a to the "R" terminal of dolly pin actuator motor 327′. Limit switch 706 is in the normal position with contact 706–a closed as the dolly pins are yet lowered.

Energizing the dolly pin actuator motor 327′ raises the dolly locking pins, locking the dolly to the carriage. At the same time, the engagement stage will be lowered. Limit switch 704 is thereby returned to the normal position and limit switch 706 is actuated. Actuation of limit switch 706 opens the circuit to the "R" terminal of the dolly pin actuator motor upon its reaching the locked pin position, stopping this motor.

Actuation of limit switch 706 also completes a circuit from 712–b; through contact 706–b now closed, and 703–a to the "R" terminal ram drive motor 300′. Limit switch 703 is in the normal position with contact 703–a closed as the ram mechanism is as yet extended.

Operation of the ram drive motor 300′ now retracts the ram, but leaves the dolly on the carriage. When the ram is fully retracted, limit switch 705 returns to the normal position and limit switch 703 will be actuated.

Actuation of limit switch 703 opens contact 703–a, stopping the ram drive motor.

Operation of limit switch 703 also de-energizes relays 711 and 712. Contact 701–a is already open, as limit switch 701 is in the normal position with no dolly in the loading station. Similarly, contact 702–a is already open as limit switch 702 is actuated by the dolly now located on the vertical conveyor carriage. As a result, the opening of contact 703–c will de-energize relays 711 and 712; the loading cycle is then completed.

*Motor brakes*

To provide exact timing of the operating sequences of the conveyor, loading and unloading cycles, each of the motors in the cycle is equipped with a brake. Such brakes are necessary to prevent "coasting" of the motor and the driven linkage after the power to the motor has been shut off.

Thus, each of the motors where timing is a factor, is equipped with a mechanical brake which is operative during the times that the motors are unenergized. When one of the motors is energized, an electric solenoid coil, connected to the motor supply, opens the brake and permits motor rotation. For example, the vertical conveyor motor, 600, has a brake solenoid 610–a. Other motors of the conveyor are shown to be similarly equipped.

While the energizing connections for the motors are shown as connected directly thereto, it is to be understood that such connections may be made through the medium of relays or other control means. These relays may then in turn be controlled from the circuits herein described. Omission of the motor control relays, is to clarify the operation of the system according to the invention.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In an automobile parking system having a reception level and a plurality of vertically located parking levels, a vertical conveyor comprising a plurality of conveyor carriages, dollies for receiving automobiles, first and second vertical hatchways each connecting vertically between the reception level and the plurality of parking levels, first and second conveyor chains located in the said first and second hatchways, said conveyor chains having intermittent periods of travel of opposed direction in the said first and second hatchways respectively, a plurality of chain beams connected between the said first and second conveyor chains to stage the said carriages, means to transfer the said dollies with automobiles thereon to and from the said carriages between the intermittent travel of the said conveyor chains, and means to lift the said carriages from the said chain beams to a position in alignment with the said reception and parking levels between the intermittent travel of the said conveyor chains.

2. In combination, an automobile parking system having a reception level and a plurality of vertical parking levels, a vertical conveyor comprising a plurality of carriages, dollies for receiving automobiles, first and second vertical hatchways each connecting vertically between the reception level and the plurality of parking levels, first and second continuous conveyor chains located in the said first and second hatchways, said conveyor chains having intermittent periods of travel of opposed direction in the said first and second hatchways respectively, means to support the said carriages from the said conveyor chains, means to lift the said carriages from the said conveyor chains to alignment with the said reception and parking levels between the intermittent periods of conveyor chain travel, means to transfer the said dollies with automobiles thereon to and from the said portion of the carriages aligned with the said reception and parking levels, means to transfer the remainder of the said carriages between the said first and second hatchways between the intermittent periods of the conveyor chain travel, means to lock the dollies to the carriages during the periods of conveyor chain travel, and electrical means sequentially controlling the intermittent periods of conveyor chain travel, the said means to lift the carriages to alignment, the means to transfer the dollies, the means to transfer the remainder of the said carriages, and the said means to lock the dollies to the carriages.

3. In an automobile parking system having a reception level and a plurality of vertically dispersed parking levels, a vertical conveyor comprising a plurality of conveyor carriers, dollies for receiving automobiles, first and second vertical hatchways in discrete vertical communication between the said reception level and the said plurality of parking levels, first and second conveyor chains located in the said first and second hatchways, self controlled cyclic means remotely initiated for actuating said conveyor chains in intermittent periods of travel of opposed direction in the said first and second hatchways respectively, a plurality of chain beams interconnecting the said first and second conveyor chains and adapted to stage the said carriers, first motor means to lift the said carriers from the said chain beams to a position in alignment with the said reception and parking levels, automatic relay means to operate the said first motor means responsive to the said cyclic means between the intermittent periods of travel of the said conveyor chains, second motor means to transfer the said dollies with automobiles thereon to and from the said carriers, and control means to operate the said second motor means responsive to the said cyclic means between the intermittent periods of travel of the said conveyor chains.

4. In an automobile parking system having a reception level and a plurality of vertically dispersed parking levels, a vertical conveyor comprising a plurality of conveyor carriages, dollies for receiving automobiles, first and second vertical hatchways in discrete vertical communication between the said reception level and the said plurality of parking levels, first and second conveyor chains located in the said first and second hatchways, electric motor means for driving said conveyor chains, self operated cyclic control means remotely initiated for the said electric motor means to provide intermittent periods of travel of the conveyor chains in opposed direction in the said first and second hatchways, a plurality of chain beams interconnecting the said first and second conveyor chains and adapted to stage the said carriages, first electrically controlled means adapted to lift the said carriages from the said chain beams to a position in alignment with the said reception and parking levels, second electrically controlled means to transfer the said dollies with automobiles thereon to and from the said carriages, means to operate the said first electrically controlled means at a given period of the said cyclic control means between the intermittent periods of travel of the said conveyor chains, and actuating means to operate the said second electrically controlled means responsive to the operation of the said first electrically controlled means.

5. In an automobile parking system having a reception level and a plurality of vertically dispersed parking levels, a vertical conveyor comprising a plurality of conveyor carriages, dollies for receiving automobiles, first and second vertical hatchways in discrete vertical communication between the said reception level and the said plurality of parking levels, first and second conveyor chains located in the said first and second hatchways, first electrically controlled means for driving said conveyor chains, a plurality of chain beams interconnecting the said first and second conveyor chains and adapted to stage the said carriages, second electrically controlled means adapted to lift the said carriages from the said chain beams to a position in alignment with the said reception and parking levels, third electrically controlled means to transfer the said dollies with automobiles thereon to and from the said carriages, self operated cyclic means remotely initiated for actuating the said first electrically controlled means to provide intermittent periods of travel of the conveyor chains, and means to operate sequentially the said second and third electrically controlled means at the period of the said cyclic means between the intermittent periods of travel of the said conveyor chains.

6. In an automobile parking system having transfer levels and a plurality of vertically dispersed parking levels, a vertical conveyor comprising a plurality of conveyor carriages, dollies for receiving automobiles, first and second vertical hatchways in discrete vertical communication between the said transfer levels and the said plurality of parking levels, first and second conveyor chains located in the said first and second hatchways, first electrically controlled means for driving said conveyor chains, a plurality of chain beams interconnecting the said first and second conveyor chains and adapted to stage the said carriages, second electrically controlled means adapted to lift the said carriages from the said chain beams to a position in alignment with the said transfer and parking levels, third electrically controlled means to transfer the said dollies with automobiles thereon to and from the said carriages, fourth electrically controlled means to transfer the said carriages between the said first and second vertical hatchways, cyclic means for operating the said first electrically controlled means to provide intermittent periods of travel of the conveyor chains, means to actuate the said second electrically controlled means during the period of the said cyclic means between the intermittent periods of travel of the said conveyor chains, and interlocking means to operate the said third and fourth electrically controlled means responsive to the actuation of the said second electrically controlled means.

7. In an automobile parking system having a reception level, a plurality of vertically dispersed parking levels, and transfer levels, a vertical conveyor comprising a plurality of conveyor carriages, dollies for receiving automobiles, first and second vertical hatchways in discrete vertical communication between the said reception level, the said plurality of parking levels, and the transfer levels, first and second conveyor chains located in the said first and second hatchways, first electrically controlled means for driving said conveyor chains, a plurality of chain beams interconnecting the said first and second conveyor chains and adapted to stage the said carriages, second electrically controlled means adapted to lift the said carriages from the said chain beams to a position in alignment with the said reception, parking and transfer levels, third electrically controlled means to transfer the said dollies with automobiles thereon to and from the said carriages, fourth electrically controlled means to transfer the said carriages between the said first and second vertical hatchways, cyclic means for operating the said first electrically controlled means to provide intermittent periods of travel of the conveyor chains, means to operate the said second electrically controlled means during the period of the said cyclic means between the intermittent periods of travel of the said conveyor chains, and interlocking means to operate the said third and fourth electrically controlled means responsive to the actuation of the said second electrically controlled means References Cited in the file of this patent

UNITED STATES PATENTS

| Number | Name | Date |
|---|---|---|
| 1,458,881 | Gromer | June 12, 1923 |
| 1,782,410 | Cook | Nov. 25, 1930 |
| 1,816,053 | McGavin | July 28, 1931 |
| 1,819,513 | James | Aug. 18, 1931 |
| 1,864,711 | Buettell | June 28, 1932 |
| 1,871,372 | James | Aug. 9, 1932 |
| 1,879,713 | Scott | Sept. 27, 1932 |
| 1,905,230 | James et al. | Aug. 25, 1933 |
| 2,013,482 | Taylor | Sept. 3, 1935 |
| 2,069,886 | Joslin | Feb. 9, 1937 |
| 2,102,995 | Coombs | Dec. 21, 1937 |
| 2,310,461 | Regan et al. | Feb. 9, 1943 |
| 2,446,344 | Smith | Aug. 3, 1948 |
| 2,569,393 | Walker | Sept. 25, 1951 |